US011976195B2

(12) United States Patent
Pingitore et al.

(10) Patent No.: US 11,976,195 B2
(45) Date of Patent: May 7, 2024

(54) POLYCARBONATE COPOLYMER AND ASSOCIATED FILM EXTRUSION COMPOSITION, EXTRUDED FILM, AND CAPACITOR

(71) Applicant: SHPP GLOBAL TECHNOLOGIES B.V., Bergen Op Zoom (NL)

(72) Inventors: Andrew Thomas Pingitore, Evansville, IN (US); Matthew Frank Niemeyer, North Chatham, NY (US); James Alan Mahood, Evansville, IN (US); Brandon Philippe Gindt, Newburgh, IN (US)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 18/388,721

(22) Filed: Nov. 10, 2023

(65) Prior Publication Data

US 2024/0117185 A1 Apr. 11, 2024

Related U.S. Application Data

(62) Division of application No. 17/319,188, filed on May 13, 2021, now Pat. No. 11,866,571.

(60) Provisional application No. 63/023,904, filed on May 13, 2020.

(30) Foreign Application Priority Data

Sep. 16, 2020 (EP) .................................... 20196451

(51) Int. Cl.

| | |
|---|---|
| ***C08L 83/10*** | (2006.01) |
| ***B32B 15/09*** | (2006.01) |
| ***B32B 27/36*** | (2006.01) |
| ***C08J 5/18*** | (2006.01) |

(52) U.S. Cl.

CPC .............. *C08L 83/10* (2013.01); *B32B 15/09* (2013.01); *B32B 27/365* (2013.01); *C08J 5/18* (2013.01); *B32B 2270/00* (2013.01); *B32B 2307/202* (2013.01); *B32B 2457/16* (2013.01); *C08J 2369/00* (2013.01); *C08J 2383/10* (2013.01); *C08J 2469/00* (2013.01); *C08J 2483/10* (2013.01)

(58) Field of Classification Search

CPC ..... C08G 64/186; C08G 77/448; C08L 69/00; C08L 83/06; C08L 83/10; C08J 2369/00; C08J 2383/10; C08J 2469/00; C08J 2483/10; C08J 5/18

See application file for complete search history.

(56) References Cited

U.S. PATENT DOCUMENTS

| | | | |
|---|---|---|---|
| 3,419,634 A | 12/1968 | Vaughn, Jr. | |
| 3,419,635 A | 12/1968 | Vaughn, Jr. | |
| 3,821,324 A | 6/1974 | Merritt, Jr. et al. | |
| 3,821,325 A | 6/1974 | Merritt, Jr. et al. | |
| 3,832,419 A | 8/1974 | Merritt, Jr. | |
| 5,019,418 A | 5/1991 | Linzey et al. | |
| 5,530,083 A | 6/1996 | Phelps et al. | |
| 6,066,700 A | 5/2000 | Konig et al. | |
| 6,072,011 A | 6/2000 | Hoover et al. | |
| 6,417,319 B1 | 7/2002 | Shibuya et al. | |
| 7,491,346 B2 | 2/2009 | Hikosaka | |
| 9,115,283 B2 | 8/2015 | Rosenquist et al. | |
| 10,217,541 B2 | 2/2019 | Silvi et al. | |
| 2004/0220330 A1 | 11/2004 | Derudder et al. | |
| 2005/0101757 A1 | 5/2005 | Glasgow et al. | |
| 2007/0241312 A1 | 10/2007 | Hikosaka | |
| 2008/0081884 A1 | 4/2008 | Glasgow et al. | |
| 2011/0207846 A1* | 8/2011 | Monden | C08L 69/00 523/134 |
| 2012/0217040 A1 | 8/2012 | Yoshida | |
| 2012/0252985 A1* | 10/2012 | Rosenquist | C08L 69/00 525/439 |
| 2014/0179843 A1 | 6/2014 | Van Der Mee et al. | |
| 2014/0295363 A1 | 10/2014 | Sun et al. | |
| 2014/0326162 A1 | 11/2014 | Van Der Mee et al. | |
| 2016/0060403 A1 | 3/2016 | Mahood et al. | |

(Continued)

FOREIGN PATENT DOCUMENTS

| | | |
|---|---|---|
| CN | 111187403 A | 5/2020 |
| CN | 111560117 A | 8/2020 |

(Continued)

OTHER PUBLICATIONS

Partial Search Report for European Application No. 20196451.7, International Filing Date Sep. 16, 2020, dated Mar. 12, 2021; 17 pages.

Extended Search Report for European Application No. 20196451.7, International Filing Date Sep. 16, 2020, dated Jul. 7, 2021; 15 pages.

*Primary Examiner* — Alicia J Weydemeyer

(74) *Attorney, Agent, or Firm* — CANTOR COLBURN LLP

(57) ABSTRACT

A composition includes specific amounts of a copolycarbonate and a roughening agent. The copolycarbonate contains first carbonate units derived from a first bisphenol monomer such that a homopolycarbonate of the first bisphenol monomer has a glass transition temperature less than 155° C., and second carbonate units derived from a second bisphenol monomer such that a homopolycarbonate of the second bisphenol monomer has a glass transition temperature of 155° C. or higher. The roughening agent includes a particulate crosslinked polymethylsilsesquioxane having a median equivalent spherical diameter greater than 5 micrometers and less than or equal to 10 micrometers.

1 Claim, No Drawings

(56) References Cited

U.S. PATENT DOCUMENTS

| | | | |
|---|---|---|---|
| 2016/0070027 | A1 | 3/2016 | Pan et al. |
| 2017/0022359 | A1 | 1/2017 | Farrell et al. |
| 2018/0079862 | A1 | 3/2018 | Meyer et al. |
| 2019/0153217 | A1 | 5/2019 | Mahood et al. |

FOREIGN PATENT DOCUMENTS

| | | | |
|---|---|---|---|
| EP | 2336247 | A1 | 6/2011 |
| EP | 3540011 | A1 | 9/2019 |
| JP | 3583718 | B2 | 11/2004 |
| JP | 2006518803 | A | 8/2006 |
| JP | 2012116915 | A | 6/2012 |
| JP | 2013256580 | A | 12/2013 |
| JP | 2016536418 | A | 11/2016 |
| JP | 2018045138 | A | 3/2018 |
| KR | 20070000402 | A | 2/2007 |
| KR | 20140027199 | A | 3/2014 |
| KR | 20160048895 | A | 5/2016 |
| KR | 20180063348 | | 6/2018 |
| WO | 2004076512 | A2 | 9/2004 |
| WO | 2005113638 | A1 | 3/2008 |
| WO | 2008042491 | A1 | 4/2008 |
| WO | 2012155116 | A1 | 11/2012 |
| WO | 2013175448 | A1 | 11/2012 |
| WO | 2014072923 | A1 | 5/2014 |
| WO | 2017196922 | A4 | 11/2017 |

* cited by examiner

POLYCARBONATE COPOLYMER AND ASSOCIATED FILM EXTRUSION COMPOSITION, EXTRUDED FILM, AND CAPACITOR

CROSS-REFERENCE TO RELATED APPLICATIONS

This application is a division of U.S. application Ser. No. 17/319,188, filed May 13, 2021, which claims priority to European Application No. 20196451.7, filed on Sep. 16, 2020, which claims the benefit of U.S. Provisional Application No. 63/023,904, filed on May 13, 2020, all of which are incorporated by reference herein in their entirety.

BACKGROUND OF THE INVENTION

This application relates to a heat-resistant extruded film, a film capacitor comprising the extruded film, and a heat-resistant polycarbonate-polysiloxane useful in forming the extruded film.

Electrostatic film capacitors with high volumetric energy density, high operating temperature, and long lifetime are critical components for pulse-power, automotive, and industrial electronics. Capacitors are essentially energy-storage devices having two parallel conductive plates separated by a thin layer of an electrically insulating (dielectric) film. When a voltage is applied across the plates, the electric field in the dielectric displaces electric charges, and thus stores energy. The amount of energy stored by a capacitor depends on the dielectric constant and breakdown voltage of the insulating material used to form the film, and the dimensions (total area and thickness) of the film. To maximize the amount of energy that a capacitor can accumulate, the dielectric constant and breakdown voltage of the film are maximized, and the thickness of the film is minimized Because the physical characteristics of the dielectric material in the capacitor are the determining factors for the performance of a capacitor, improvements in one or more of the physical properties of the dielectric material in a capacitor can result in corresponding performance improvements in the capacitor component, usually resulting in performance and lifetime enhancements of the electronics system or product in which it is embedded.

High temperature polycarbonate copolymers have been used in the formation of electrostatic film capacitors. See, for example, U.S. Patent Application Publication Nos. US 2016/0060403 A1 and US 2019/0153217 A1 of Mahood et al. However, there is a desire for extrusion compositions exhibiting an improved ability to be extruded as films having thicknesses of less than ten micrometers.

BRIEF SUMMARY OF EMBODIMENTS OF THE INVENTION

One embodiment is a polycarbonate-polysiloxane comprising, based on 100 mole percent of total carbonate units in the polycarbonate-polysiloxane, 20 to 69.95 mole percent of first carbonate units having the structure

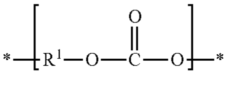

wherein $R^1$ is a $C_6$-$C_{16}$ divalent aromatic group; 30 to 79.95 mole percent of second carbonate units having the structure

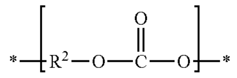

wherein $R^2$ is a $C_{17}$-$C_{40}$ divalent aromatic group having the structure

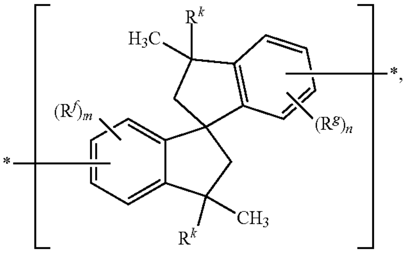

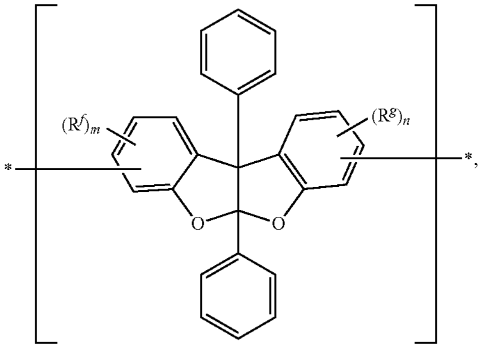

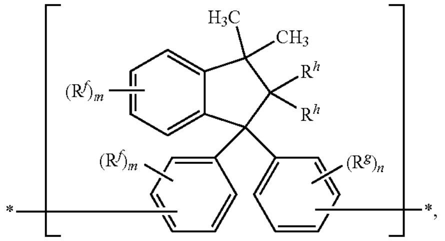

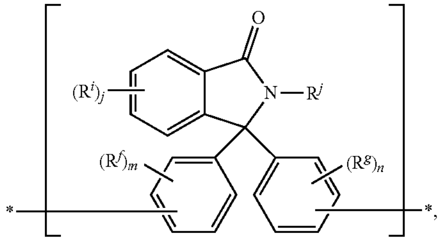

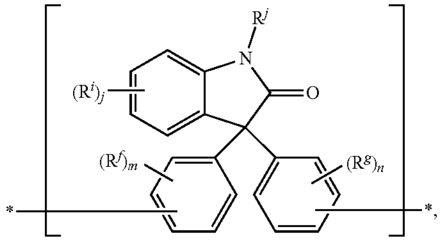

-continued

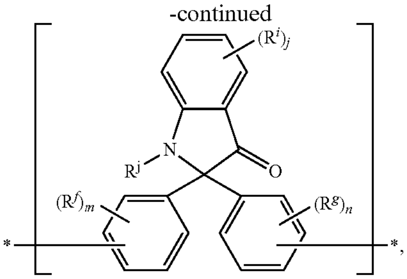

or

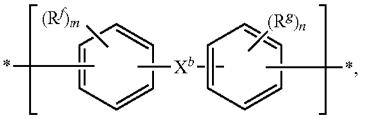

wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^1$ is independently $C_1$-$C_6$ alkyl; RR is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is $-(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0.05 to 0.4 mole percent of third carbonate units, each third carbonate unit comprising a divalent carbonate group and a divalent polysiloxane group, the divalent polysiloxane group comprising 5 to 60 diorganosiloxane units having the structure

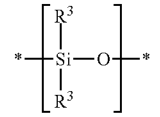

wherein each occurrence of $R^3$ is independently a $C_1$-$C_{13}$ hydrocarbyl group; wherein the polycarbonate-polysiloxane has a weight average molecular weight of 18,000 to 35,000 grams/mole, determined by gel permeation chromatography with bisphenol A polycarbonate standards; and wherein if the polycarbonate-polysiloxane comprises 70 to 79.95 mole percent of the second carbonate units, then the polycarbonate-polysiloxane has a weight average molecular weight of 18,000 to 24,000 grams/mole.

Another embodiment is a composition comprising a polycarbonate-polysiloxane comprising, based on 100 mole percent of total carbonate units in the polycarbonate-polysiloxane: 20 to 69.95 mole percent of first carbonate units having the structure

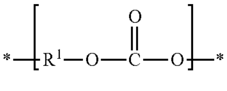

wherein $R^1$ is a $C_6$-$C_{16}$ divalent aromatic group; 30 to 79.95 mole percent of second carbonate units having the structure

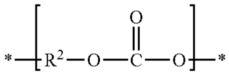

wherein $R^2$ is a $C_{17}$-$C_{40}$ divalent aromatic group having the structure

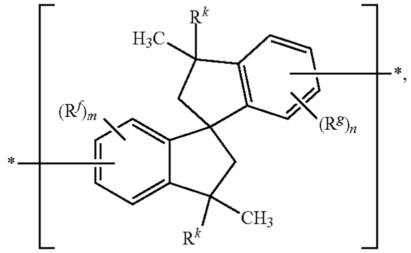

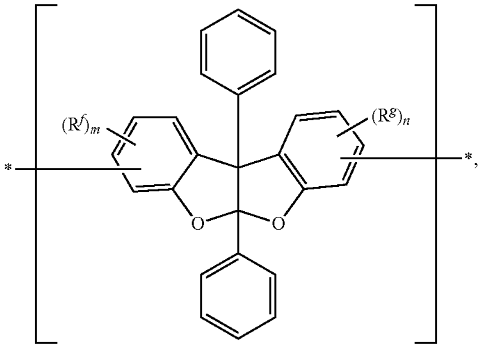

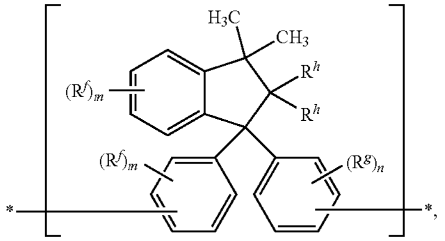

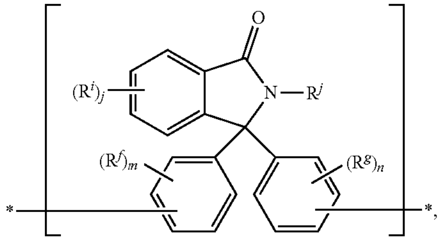

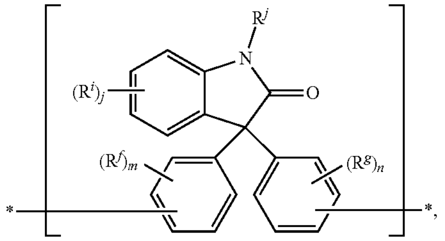

-continued

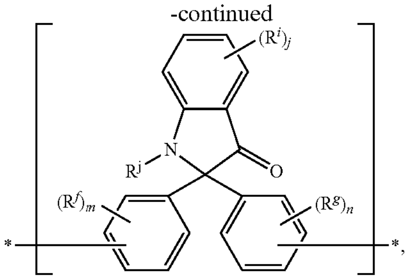

, or

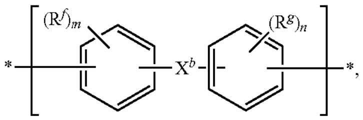

wherein $R^f$ and $R^g$ are each independently at each occurrence $C_1$-$C_{12}$, alkyl, $C_1$-$C_{12}$, alkoxyl, or $C_2$-$C_{12}$ alkenyl; each $R^h$ is hydrogen or two occurrence of $R^h$ combine with the carbon atom to which they are attached to form a carbonyl group; each occurrence of $R^i$ is independently $C_1$-$C_6$ alkyl; $R^j$ is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0.05 to 0.4 mole percent of third carbonate units, each third carbonate unit comprising a divalent carbonate group and a divalent polysiloxane group, the divalent polysiloxane group comprising 5 to 60 diorganosiloxane units having the structure

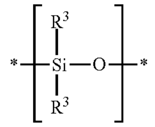

wherein each occurrence of $R^3$ is independently a $C_1$-$C_{13}$ hydrocarbyl group; wherein the polycarbonate-polysiloxane has a weight average molecular weight of 18,000 to 35,000 grams/mole, determined by gel permeation chromatography with bisphenol A polycarbonate standards; and wherein if the polycarbonate-polysiloxane comprises 70 to 79.95 mole percent of the second carbonate units, then the polycarbonate-polysiloxane has a weight average molecular weight of 18,000 to 24,000 grams/mole.

Another embodiment is an extruded film comprising the composition in any of its variations described herein.

Another embodiment is a capacitor comprising the extruded film, and an electrically conductive metal layer in contact with the extruded film.

Another embodiment is a composition comprising, based on the total weight of the composition: 65 to 99.95 weight percent of a copolycarbonate comprising first carbonate units derived from a first bisphenol monomer such that a homopolycarbonate of the first bisphenol monomer has a glass transition temperature less than 155° C. determined by dynamic mechanical analysis according to ASTM E1640-13 at a heating rate of 1° C./minute, and second carbonate units derived from a second bisphenol monomer such that a homopolycarbonate of the second bisphenol monomer has a glass transition temperature of 155° C. or higher determined by dynamic mechanical analysis according to ASTM E1640-13 at a heating rate of 1° C./minute; and 0.05 to 2 weight percent of a roughening agent comprising a particulate crosslinked polymethylsilsesquioxane having a median equivalent spherical diameter greater than 5 micrometers and less than or equal to 10 micrometers determined by laser diffraction according to ISO 13320:2009.

These and other embodiments are described in detail below.

DETAILED DESCRIPTION OF THE INVENTION

The present inventors have determined extrusion compositions comprising as their primary component a polycarbonate-polysiloxane comprising specific amounts of polysiloxane carbonate units and two types of aromatic carbonate units exhibit an improved ability to be extruded as films having thicknesses of less than ten micrometers.

One embodiment is a polycarbonate-polysiloxane comprising, based on 100 mole percent of total carbonate units in the polycarbonate-polysiloxane, 20 to 69.95 mole percent of first carbonate units having the structure

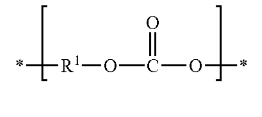

wherein $R^1$ is a $C_6$-$C_{16}$ divalent aromatic group; 30 to 79.95 mole percent of second carbonate units having the structure

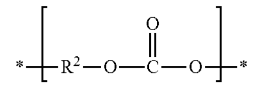

wherein $R^2$ is a $C_{17}$-$C_{40}$ divalent aromatic group having the structure

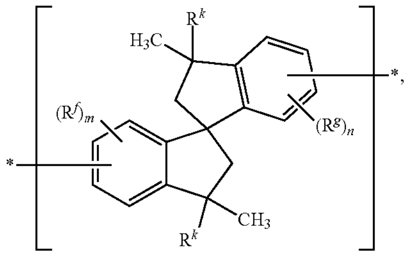

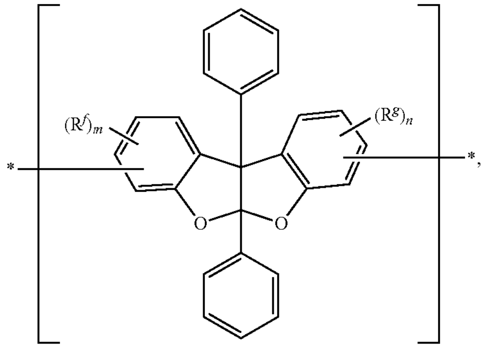

-continued

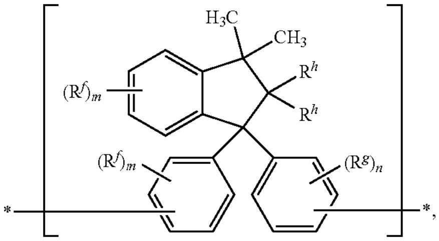

,

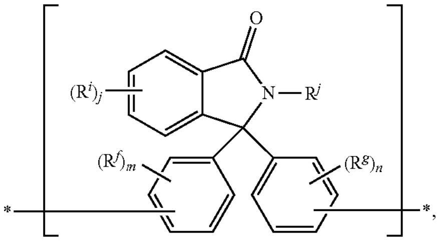

,

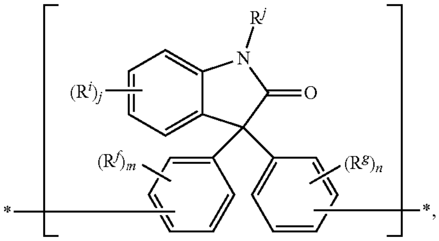

,

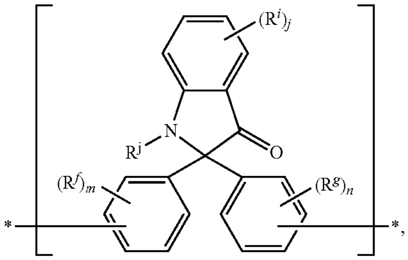

, or

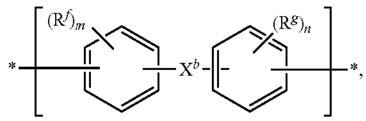

, wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^1$ is independently $C_1$-$C_6$ alkyl; RV is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —$C(R^m)(R^n)$— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0.05 to 0.4 mole percent of third carbonate units, each third carbonate unit comprising a divalent carbonate group and a divalent polysiloxane group, the divalent polysiloxane group comprising 5 to 60 diorganosiloxane units having the structure

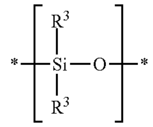

wherein each occurrence of $R^3$ is independently a $C_1$-$C_{13}$ hydrocarbyl group; wherein the polycarbonate-polysiloxane has a weight average molecular weight of 18,000 to 35,000 grams/mole, determined by gel permeation chromatography with bisphenol A polycarbonate standards; and wherein if the polycarbonate-polysiloxane comprises 70 to 79.95 mole percent of the second carbonate units, then the polycarbonate-polysiloxane has a weight average molecular weight of 18,000 to 24,000 grams/mole. As used herein, the term "hydrocarbyl," whether used by itself, or as a prefix, suffix, or fragment of another term, refers to a residue that contains only carbon and hydrogen unless it is specifically identified as "substituted hydrocarbyl." The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen.

The polycarbonate-polysiloxane comprises first carbonate units, second carbonate units, and third carbonate units. The first (low heat) carbonate units have the structure

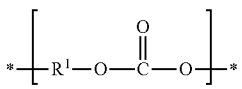

wherein $R^1$ is a $C_6$-$C_{16}$ divalent aromatic group. "Low heat" means that a homopolymer of the first carbonate units has a glass transition temperature of 135° C. to less than 155° C., determined by differential scanning calorimetry according to ASTM D3418-15 at a heating rate of 20° C./minute.

In some embodiments, the first carbonate units have the structure

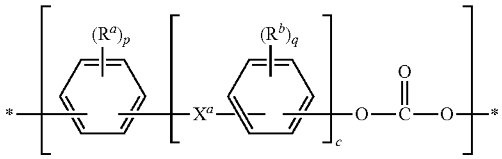

wherein $R^a$ and $R^b$ are each independently halogen (i.e., F, Cl, Br, or I), $C_1$-$C_3$ alkyl, or $C_1$-$C_3$ alkoxyl; c is zero or 1; p and q are each independently zero or 1; and $X^a$ is a single bond, —O—, —S—, —S(O)—, —$S(O)_2$—, —C(O)—, or a $C_1$-$C_4$ divalent hydrocarbylene group, which can be cyclic or acyclic, aromatic or non-aromatic, and can further comprise one or more heteroatoms selected from halogens, oxygen, nitrogen, sulfur, silicon, and phosphorus. In some embodiments, c is zero. In other embodiments, c is 1. In some embodiments, c is 1; and $X^a$ is selected from $C_3$-$C_6$ cycloalkylene (e.g., 1,4-cyclohexylene), $C_3$-$C_6$ cycloalkylidene (e.g., cyclohexylidene), a $C_1$-$C_6$ alkylidene of the formula —$C(R^n)(R^d)$— wherein Re and $R^d$ are each independently hydrogen, $C_1$-$C_5$ alkyl, or a group of the formula —C(=$R^e$)— wherein $R^e$ is a divalent $C_1$-$C_5$ hydrocarbon group. $X^a$ and each terminal bond of the first carbonate unit can be disposed ortho, meta, or para (preferably para) to each other. In some embodiments, p and q are each zero. In some embodiments, c is 1; p and q are each 1; and $R^a$ and $R^b$ are each methyl, disposed meta to $X^a$. Some illustrative examples of dihydroxy compounds that can be used to form first carbonate units are described in U.S. Patent Application Publication Number US 2014/0295363 A1 of Sun et al., and International Patent Application Publication Numbers WO 2013/175448 A1 of Chen et al., and WO 2014/072923 A1 of Fernandez et al.

In some embodiments, the first carbonate unit is derived from bisphenol A, has the structure

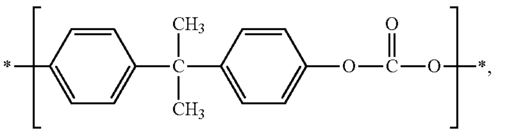

and is referred to as a bisphenol A carbonate unit.

The polycarbonate-polysiloxane comprises the first (low heat) carbonate units in an amount of 20 to 69.95 mole percent, based on 100 mole percent of total carbonate units in the polycarbonate-polysiloxane. Within this range, the amount of first carbonate units can be 30 to 69.95 mole percent, 35 to 64.95 mole percent, or 45 to 64.95 mole percent.

In addition to the first (low heat) carbonate units, the polycarbonate-polysiloxane comprises second (high heat) carbonate units having the structure

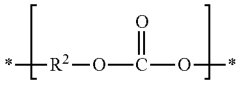

wherein $R^2$ is a $C_{17}$-$C_{40}$ divalent aromatic group. "High heat" means that a homopolymer of the second carbonate units has a glass transition temperature of 155° C. or higher, or 155 to 300° C., determined by differential scanning calorimetry according to ASTM D3418-15 at a heating rate of 20° C./minute. Examples of second carbonate units include those having the structures

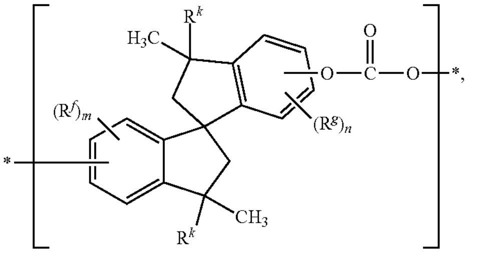

-continued

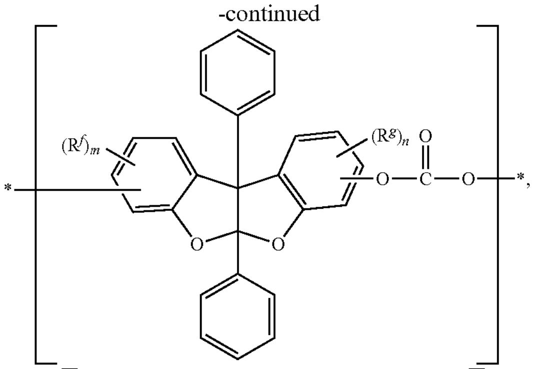

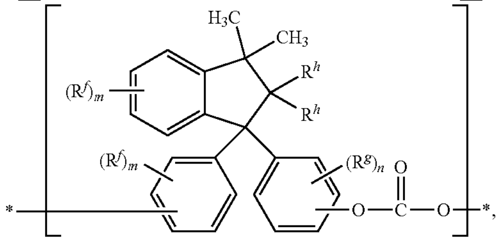

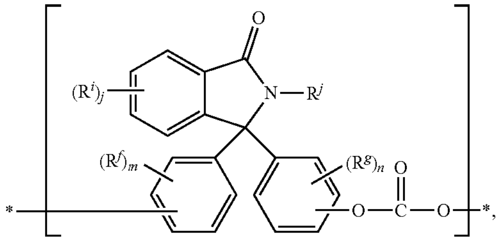

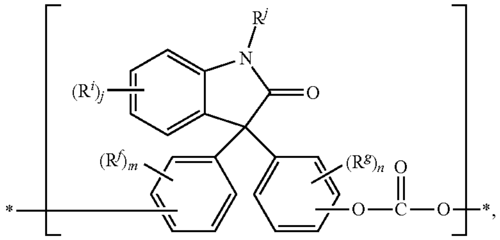

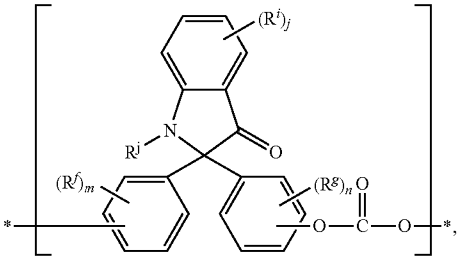

and

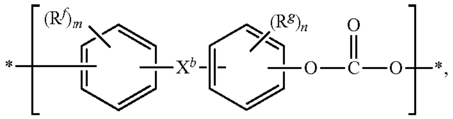

wherein $R^f$ and $R^g$ are each independently at each occurrence $C_1$-$C_{12}$ alkyl, $C_1$-$C_{12}$, alkoxyl, or $C_2$-$C_{12}$ alkenyl; each $R^h$ is hydrogen or two occurrence of $R^h$ combine with the carbon atom to which they are attached to form a carbonyl group; each occurrence of $R^1$ is independently $C_1$-$C_6$ alkyl; RV is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$, alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4. In some embodiments, $R^f$ and $R^g$ are each independently at each occurrence $C_1$-$C_3$ alkyl or $C_1$-$C_3$ alkoxyl; each $R^1$ is $C_1$-$C_3$ alkyl; RV is methyl or phenyl; and each $R^k$ is methyl.

Exemplary second carbonate units include those having the structures

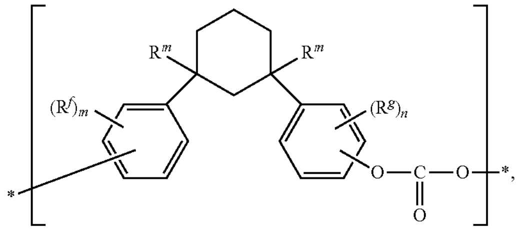

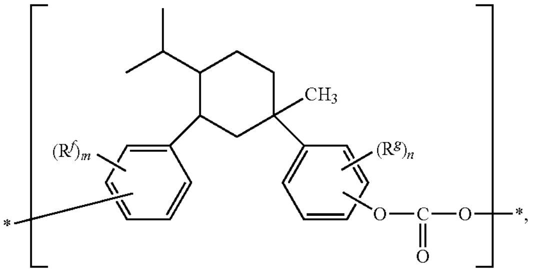

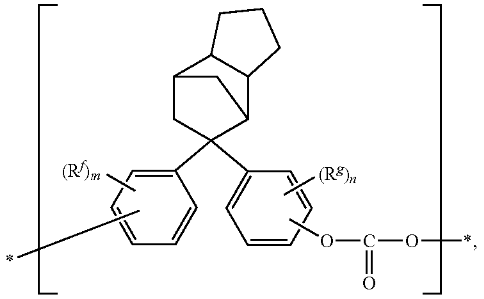

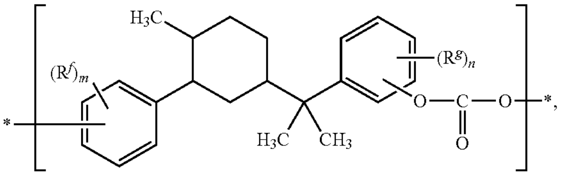

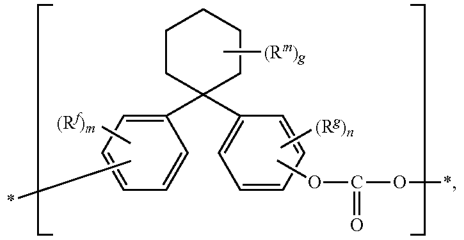

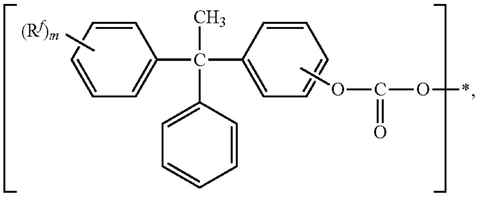

-continued

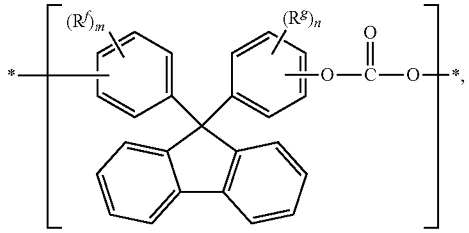

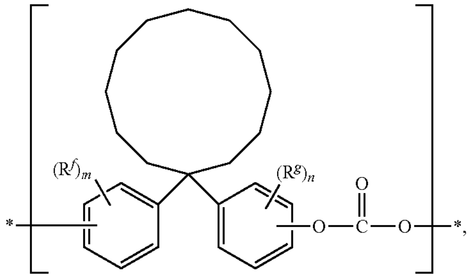

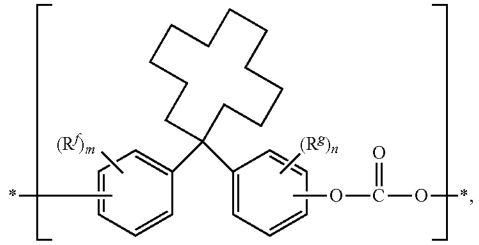

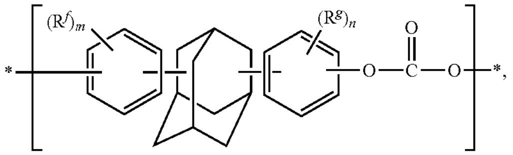

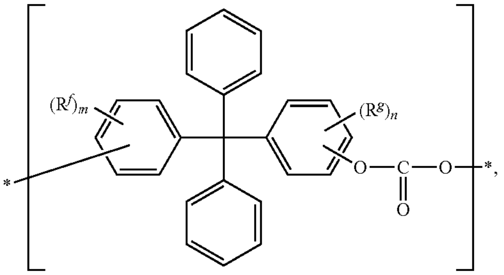

and

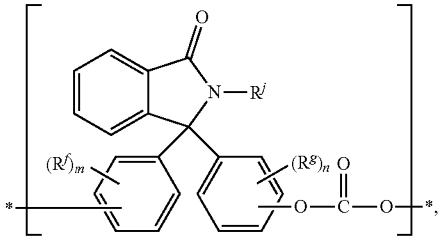

or $C_1$-$C_4$ alkyl; and g is zero, 1, 2, 3, 4, 5, 6, 7, 8, 9, or 10. In some embodiments, $R^f$ and $R^g$ are each independently $C_1$-$C_3$ alkyl or $C_1$-$C_3$ alkoxyl; each $R^m$ is methyl; and m and n are each independently zero or 1.

In some embodiments, the second carbonate units have the structure

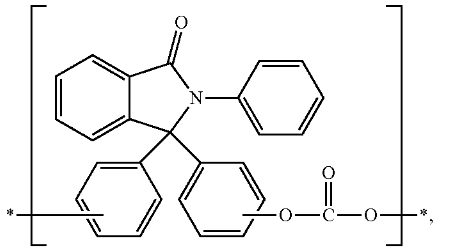

-continued

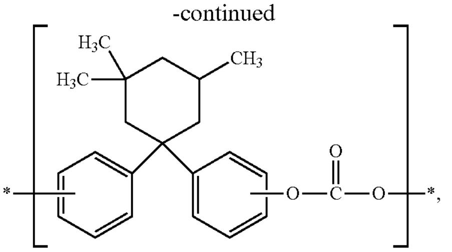

or a combination thereof, where the first structure above is referred to as 2-phenyl-3,3'-bis(4-hydroxyphenyl)phthalimidine carbonate or PPPBP carbonate, and the second structure above is referred to as bisphenol isophorone carbonate or BPI carbonate.

The polycarbonate-polysiloxane comprises the second (high heat) carbonate units in an amount of 30 to 79.95 mole percent, based on 100 mole percent of total carbonate units in the polycarbonate-polysiloxane. Within this range, the amount of second carbonate units can be 30 to 69.95 mole percent, 35 to 64.95 mole percent, or 35 to 54.95 mole percent.

In addition to the first (low heat) carbonate units and the second (high heat) carbonate units, the polycarbonate-polysiloxane further comprises third (polysiloxane-containing) carbonate units. Each of the third carbonate units comprises a divalent carbonate group (—OC(O)O—) and a divalent polysiloxane group, the divalent polysiloxane group comprising 5 to 60 diorganosiloxane units having the structure

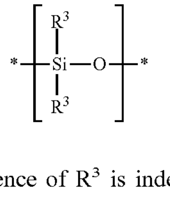

wherein each occurrence of $R^3$ is independently a $C_1$-$C_{14}$ hydrocarbyl group.

The $C_1$-$C_{14}$ hydrocarbyl group can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. Examples of $R^3$ groups include $C_1$-$C_{14}$ alkyl, $C_1$-$C_{14}$ alkoxyl, $C_2$-$C_{14}$ alkenyl, $C_2$-$C_{14}$ alkenyloxyl, $C_6$-$C_{14}$ aryl, $C_6$-$C_{14}$ aryloxyl, $C_7$-$C_{14}$ arylalkyl, and $C_6$-$C_{14}$ alkylaryl. In some embodiments, each occurrence of $R^3$ is methyl.

Each of the third carbonate units comprises 5 to 60 diorganosiloxane units. Within this range, the number of diorganosiloxane units can be 10 to 60, or 20 to 60, or 30 to 60, or 35 to 55.

In some embodiments, the third carbonate units have the structure,

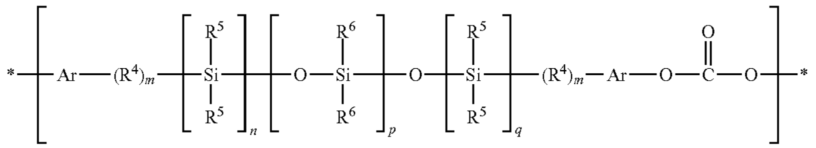

wherein Ar is independently at each occurrence a $C_6$-$C_{24}$ aromatic divalent group optionally substituted with 1, 2, 3, or 4 substituents, each substituent independently selected from the group consisting of halogen (i.e., F, Cl, Br, or I), $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$, alkyl or $C_6$-$C_{18}$ aryl; m and n and q are independently at each occurrence zero or 1; and p is (30-n-q) to (60-n-q), or (35-n-q) to (55-n-q).

Examples of Ar groups include 1,3-phenylene, 1,4-phenylene, and 2,2-bis(4-phenylenyl)propane. When each occurrence of m, n, and q is zero, each occurrence of Ar can be derived from a $C_6$-$C_{24}$ dihydroxyarylene compound, such as, for example, resorcinol, 1,1-bis(4-hydroxyphenyl)methane, 1,1-bis(4-hydroxyphenyl)ethane, 1,1-bis(4-hydroxyphenyl)propane, 2,2-bis(4-hydroxyphenyl)propane, 1,1-bis(4-hydroxyphenyl)butane, 2,2-bis(4-hydroxyphenyl)butane, 2,2-bis(4-hydroxyphenyl)octane, 2,2-bis(4-hydroxy-3-methylphenyl)propane, 1,1-bis(4-hydroxyphenyl)cyclohexane, bis(4-hydroxyphenyl)sulfide, 2,2-bis(3,5-dibromo-4-hydroxyphenyl)propane, and 1,1-bis(4-hydroxy-3-t-butylphenyl)propane.

Examples of $R^4$ groups include, for example, dimethylene (—$(CH_2)_2$—), trimethylene (—$(CH_2)_3$—), hexamethylene (—$(CH_2)_6$—), and 1,4-cyclohexylene. In some embodiments, each occurrence of $R^4$ is trimethylene.

Examples of $R^5$ and $R^6$ groups include, for example, methyl, ethyl, 1-propyl, cyclohexyl, and phenyl. In some embodiments, each occurrence of $R^5$ and $R^6$ is methyl.

In some embodiments, each occurrence of m and n and q is zero. In other embodiments, each occurrence of m and n and q is 1. In some embodiments, p is (35-n-q) to (55-n-q).

In some embodiments, the third carbonate units have the structure,

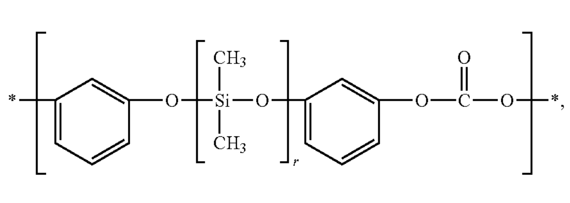

wherein r is 5 to 60, or 5 to 60, or 10 to 60, or 20 to 60, or 30 to 60, or 35 to 55.

In other embodiments, the third carbonate units have the structure,

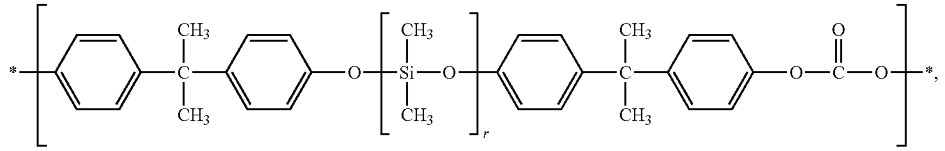

wherein r is 5 to 60, or 5 to 60, or 10 to 60, or 20 to 60, or 30 to 60, or 35 to 55.

In still other embodiments, the third carbonate units have the structure,

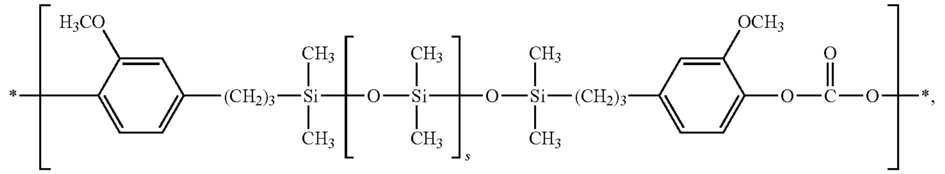

wherein s is 3 to 58, or 8 to 58, or 18 to 58, or 28 to 58, or 33 to 53. When s is 43, the structure is referred to as D45 carbonate.

The polycarbonate-polysiloxane comprises third carbonate units in an amount of 0.05 to 0.4 mole percent, based on 100 mole percent of total carbonate units in the polycarbonate-polysiloxane. Within this range, the third carbonate units can be present in an amount of 0.05 to 0.35 mole percent, or 0.05 to 0.3 mole percent, or 0.05 to 0.25 mole percent.

In some embodiments, the polycarbonate-polysiloxane comprises 30 to 69.95 mole percent of first carbonate units, 30 to 69.95 mole percent of second carbonate units, and 0.05 to 0.35 mole percent of third carbonate units, based on 100 mole percent of total carbonate units in the polycarbonate-polysiloxane.

In other embodiments, the polycarbonate-polysiloxane comprises 35 to 64.95 mole percent of first carbonate units, 35 to 64.95 mole percent of second carbonate units, and 0.05 to 0.3 mole percent of third carbonate units, based on 100 mole percent of total carbonate units in the polycarbonate-polysiloxane.

In other embodiments, the polycarbonate-polysiloxane comprises 45 to 64.95 mole percent of first carbonate units, 35 to 54.95 mole percent of second carbonate units, and 0.05 to 0.25 mole percent of third carbonate units, based on 100 mole percent of total carbonate units in the polycarbonate-polysiloxane.

In some embodiments, the polycarbonate-polysiloxane has a weight average molecular weight of 10,000 to 50,000 grams/mole, as determined by gel permeation chromatography using bisphenol A polycarbonate standards. Within this range, the weight average molecular weight can be 15,000 to 40,000 grams/mole, or 24,000 to 30,000 grams/mole.

In some embodiments of the polycarbonate-polysiloxane, the first carbonate units have the structure

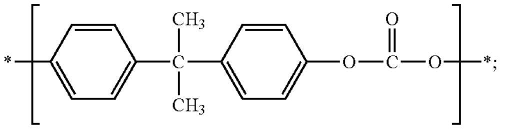

and the second carbonate units have the structure

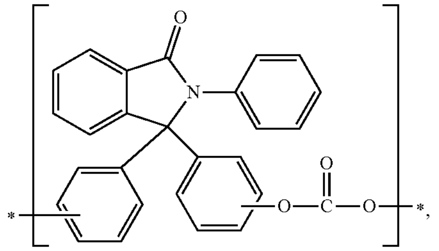

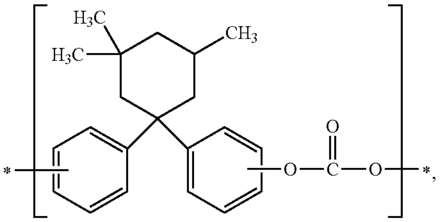

or a combination thereof.

In some embodiments of the polycarbonate-polysiloxane, the third carbonate units have the structure

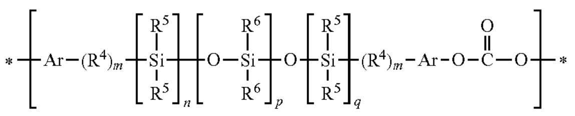

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$, alkyl or $C_6$-$C_{18}$ aryl; m and n and q are independently at each occurrence zero or 1; and p is (30-n-q) to (60-n-q), or (35-n-q) to (55-n-q).

In some embodiments, the polycarbonate-polysiloxane comprises 35 to 64.95 mole percent of first carbonate units, 35 to 64.95 mole percent of second carbonate units, and 0.05 to 0.3 mole percent of third carbonate units.

In a very specific embodiment of the polycarbonate-polysiloxane, the first carbonate units have the structure

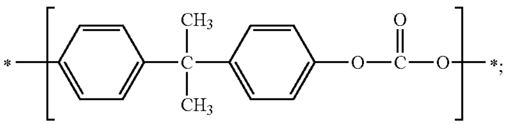

the second carbonate units have the structure

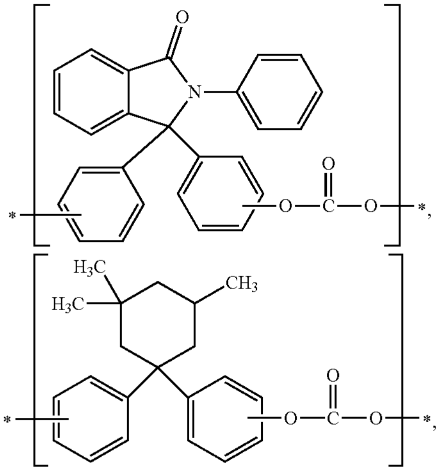

or a combination thereof; the third carbonate units have the structure

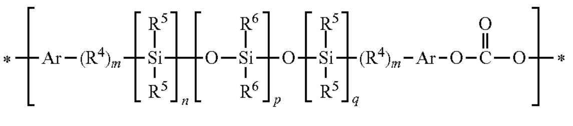

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$, alkyl or $C_6$-$C_{18}$ aryl; m and n and q are independently at each occurrence zero or 1; and p is (30-n-q) to (60-n-q), or (35-n-q) to (55-n-q); the polycarbonate-polysiloxane comprises 35 to 64.95 mole percent of first carbonate units, 35 to 64.95 mole percent of second carbonate units, and 0.05 to 0.3 mole percent of third carbonate units; and the polycarbonate-polysiloxane has a weight average molecular weight of 20,000 to 35,000 grams/mole, determined by gel permeation chromatography using bisphenol A polycarbonate standards.

In another very specific embodiment of the polycarbonate-polysiloxane, the first carbonate units have the structure

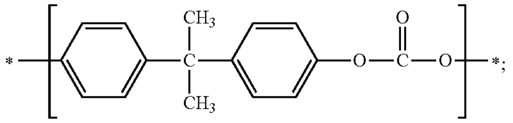

the second carbonate units have the structure

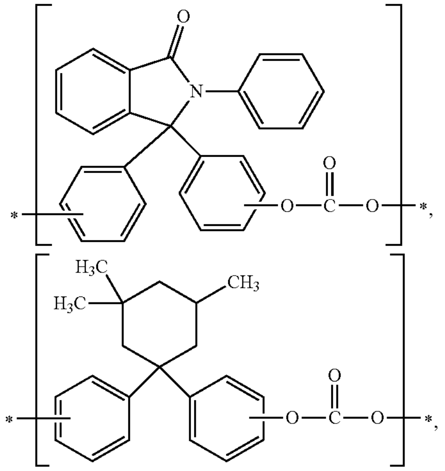

or a combination thereof; the third carbonate units have the structure

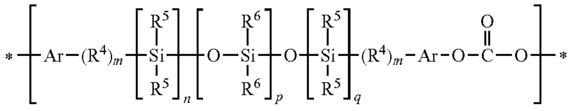

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$ alkyl or $C_6$-$C_{18}$ aryl; m and n and q are independently at each occurrence zero or 1; and p is (30-n-q) to (60-n-q), or (35-n-q) to (55-n-q); the polycarbonate-polysiloxane comprises 45 to 69.95 mole percent of first carbonate units, 30 to 54.95 mole percent of second carbonate units, and 0.05 to 0.16 mole percent of third carbonate units; and the polycarbonate-polysiloxane has a weight average molecular weight of 20,000 to 35,000 grams/mole, determined by gel permeation chromatography using bisphenol A polycarbonate standards.

The polycarbonate-polysiloxane can be prepared using known methods for synthesizing polycarbonate copolymers, including those described in, for example, U.S. Pat. Nos. 3,419,634 and 3,419,635 to Vaughn, U.S. Pat. No. 3,821,325 to Merritt et al., U.S. Pat. No. 3,832,419 to Merritt, and U.S.

Pat. No. 6,072,011 to Hoover. A detailed procedure for synthesizing a polycarbonate-polysiloxane is included in the working examples below.

Another embodiment is a composition comprising the polycarbonate-polysiloxane in any of its above-described variations. Thus, one embodiment is a polycarbonate-polysiloxane comprising, based on 100 mole percent of total carbonate units in the polycarbonate-polysiloxane: 20 to 69.95 mole percent of first carbonate units having the structure

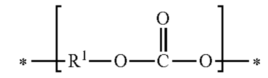

wherein $R^1$ is a $C_6$-$C_{16}$ divalent aromatic group; 30 to 79.95 mole percent of second carbonate units having the structure

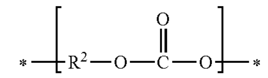

wherein $R^2$ is a $C_{17}$-$C_{40}$ divalent aromatic group; and 0.05 to 0.4 mole percent of third carbonate units, each third carbonate unit comprising a divalent carbonate group (—OC(O)O—) and a divalent polysiloxane group, the divalent polysiloxane group comprising 5 to 60 diorganosiloxane units having the structure

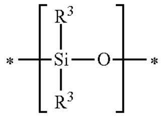

wherein each occurrence of $R^3$ is independently a $C_1$-$C_{13}$ hydrocarbyl group; wherein the polycarbonate-polysiloxane has a weight average molecular weight of 18,000 to 35,000 grams/mole, determined by gel permeation chromatography with bisphenol A polycarbonate standards; and wherein if the polycarbonate-polysiloxane comprises 70 to 79.95 mole percent of the second carbonate units, then the polycarbonate-polysiloxane has a weight average molecular weight of 18,000 to 24,000 grams/mole.

The composition is useful for forming extruded films. When used for this purpose, the composition typically comprises 70 to 100 weight percent of the polycarbonate-polysiloxane, based on the total weight of the composition.

In some embodiments, the composition further comprises a roughening agent. Roughening agents provide extruded films with surface roughness, i.e., physical texture. Suitable roughening agents include particulate materials comprising, for example, synthetic or natural silicas, limestones, talcs, zeolites, crosslinked silicones, cyclic olefin copolymers, and combinations thereof.

The roughening agent can comprise a crosslinked silicone, preferably a crosslinked silsesquioxane, more preferably a crosslinked polymethylsilsesquioxane. Silsesquioxanes are cage-like structures having Si—O—Si linkages and tetrahedral Si vertices. Silsesquioxanes can be in molecular form as cages with 6, 8, 10, or 12 Si vertices, as well as in polymer form. The cages are sometimes labeled $T_6$ $T_8$, $T_{10}$, and $T_{12}$, respectively (T=tetrahedral vertex). The $T_8$ cages have the formula $[R—SiO_{1.5}]_8$, or equivalently $R_8Si_8O_{12}$. Each Si center is bonded to three oxo groups, which in turn connect to other Si centers. The fourth group on Si is an R group. Each R group can independently be a $C_1$-$C_8$ alkyl, a $C_1$-$C_8$ alkenyl, an acrylate, a methacrylate, a hydroxyl, or an epoxide. Crosslinked polymethylsilsesquioxane particles are spherical and have a pliable, gel-like consistency, making them amenable to processing using fine filters. For example, when the composition is passed through a melt filter (e.g., a 5 micrometer filter), the roughening agent does not clog the filter, avoiding the problems encountered when inorganic fine particles are used as roughening agents. In some embodiments, the roughening agent comprises a particulate crosslinked polymethylsilsesquioxane having a median equivalent spherical diameter of 0.1 to 10 micrometers, or 0.1 to 5 micrometers, or 0.1 to 3 micrometers, or 0.2 to 2 micrometers, determined by laser diffraction according to ISO 13320:2009. Particulate crosslinked polymethylsilsesquioxanes are commercially available, for example under the trade name TOSPEARL from Momentive Performance Chemicals.

When present in the composition, the roughening agent can be used in an amount of 0.05 to 2 weight percent, based on the total weight of the composition. Within this range, the roughening agent amount can be 0.05 to 1 weight percent, or 0.1 to 0.8 weight percent, or 0.15 to 0.6 weight percent.

The composition can, optionally, include an organic slip agent. Organic slip agents improve the handling characteristics of extruded films. Suitable organic slip agents include, for example, pentaerythritol tetrastearate, dipentaerythritol hexastearate, glycerol tristearate, high density polyethylene, polymethylpentene, and combinations thereof. When present, the organic slip agent can be used in an amount of 0.1 to 15 weight percent, based on the total weight of the composition. Within this range, the organic slip agent amount can be 0.1 to 5 weight percent, or 0.1 to 2 weight percent, or 0.1 to 1 weight percent.

The composition can, optionally, include one or more additives known in the thermoplastics art. Additives include, for example, stabilizers, mold release agents, lubricants, processing aids, drip retardants, nucleating agents, ultraviolet light absorbers, colorants (including dyes and pigments), antioxidants, anti-static agents, blowing agents, metal deactivators, antiblocking agents, and combinations thereof. When present, such additives are typically used in a total amount of less than or equal to 10 weight percent, or less than or equal to 5 weight percent, or less than or equal to 1 weight percent, based on the total weight of the composition.

In a very specific embodiment, the composition comprises 70 to 99.95 weight percent of the polycarbonate-polysiloxane and further comprises 0.05 to 2 weight percent of a roughening agent; the polycarbonate-polysiloxane comprises 35 to 64.95 mole percent of first carbonate units, 35 to 64.95 mole percent of second carbonate units, and 0.05 to 0.3 mole percent of third carbonate units; the first carbonate units have the structure

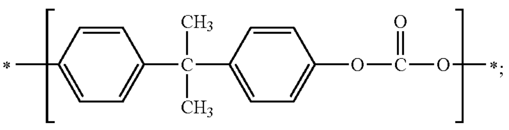

the second carbonate units have the structure

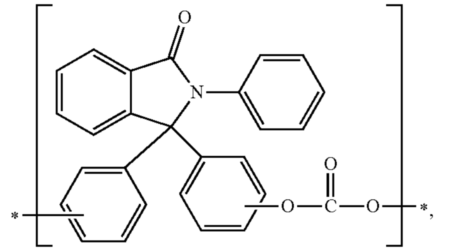

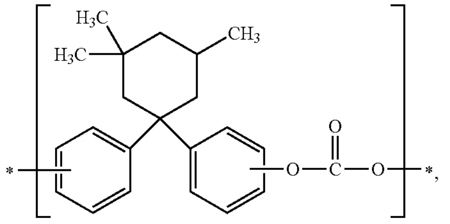

or a combination thereof; the third carbonate units have the structure

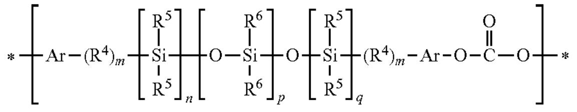

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$, alkyl or $C_6$-$C_{18}$ aryl; m and n and q are independently at each occurrence zero or 1; and p is (30-n-q) to (60-n-q); the polycarbonate-polysiloxane has a weight average molecular weight of 20,000 to 35,000 grams/mole, determined by gel permeation chromatography using bisphenol A polycarbonate standards; and the roughening agent comprises a particulate crosslinked polymethylsilsesquioxane having a median equivalent spherical diameter of 0.1 to 10 micrometers determined by laser diffraction according to ISO 13320:2009.

Another embodiment is an extruded film comprising the composition in any of its above-described variations. The composition can be extruded using extruders conventionally used for thermoplastic compositions using a flat die. An extrusion cast film method can include melting the composition in an extruder, conveying the molten composition through a flat die of small lip gap separation, optionally stretching of the film using relatively high take-up speeds, and cooling/solidifying the film-forming composition to form the final film. The extruder can be of the single- or twin-screw design, and a melt pump can be used to provide a constant, non-pulsating flow of polymer through the die. The die lip gap can be as small as 100-200 micrometers, and the take-up rollers can operate at speeds of up to 200 meters/minute. The design can include the addition of a heated roll to temper/anneal the film and thus minimize the occurrence of frozen-in internal stresses. The edges of the film can be trimmed, and the film wound up on a roll using a tension-controlled winding mechanism. The accuracy of delivering a constant and uniform flow of molten polymer through the die, the rheological properties of the polymer used to make the film, the cleanliness of both polymer and equipment, and the mechanical characteristics of the take-up mechanism will all contribute to the successful preparation of extruded films of relatively small thicknesses. In some embodiments, the film thickness is 2 to 15 micrometers, or 2 to 10 micrometers, or 2 to 8 micrometers, or 2 to 6 micrometers.

In some embodiments, the extruded film has a thickness of 2 to 15 micrometers, and the composition comprises, based on the total weight of the composition, 70 to 99.95 weight percent of the polycarbonate-polysiloxane, and 0.05 to 2 weight percent of a roughening agent comprising a particulate crosslinked polymethylsilsesquioxane having a median equivalent spherical diameter of 0.1 to 10 micrometers determined by laser diffraction according to ISO 13320:2009.

Another embodiment is a metallized film (e.g., a film capacitor) comprising: an extruded film comprising the composition in any of its above-described variations; and an electrically conductive metal layer in contact with the extruded film. A variety of metals and metal alloys can be used for the electrically conductive metal layer, depending on the intended use of the film. In some embodiments, the electrically conductive metal layer comprises a metal selected from the group consisting of copper, aluminum, silver, gold, nickel, zinc, titanium, chromium, vanadium, platinum, tantalum, niobium, brass, and combinations thereof. Methods for the metallization of polymer films are known, and include, for example, vacuum metal vapor deposition, metal sputtering, plasma treatments, electron beam treatments, chemical oxidation, or reduction reactions, as well as electroless wet-chemical deposition. The extruded film can be metallized on both sides by conventional electroless plating. Alternatively, a patterned metal layer can be formed on a surface of the film, for example by ink jet printing. The thickness of the electrically conductive metal layer is determined by the intended use of the metallized film, and can be, for example, 0.1 to 1000 nanometers, or 0.5 to 500 nanometers, or 1 to 10 nanometers.

Another embodiment is a composition comprising, based on the total weight of the composition: 65 to 99.95 weight percent of a copolycarbonate comprising first carbonate units derived from a first bisphenol monomer such that a homopolycarbonate of the first bisphenol monomer has a glass transition temperature less than 155° C. determined by dynamic mechanical analysis according to ASTM E1640-13 at a heating rate of 1° C./minute, and second carbonate units derived from a second bisphenol monomer such that a homopolycarbonate of the second bisphenol monomer has a glass transition temperature of 155° C. or higher determined by dynamic mechanical analysis according to ASTM E1640-13 at a heating rate of 1° C./minute; and 0.05 to 2 weight percent of a roughening agent comprising a particulate crosslinked polymethylsilsesquioxane having a median equivalent spherical diameter greater than 5 micrometers and less than or equal to 10 micrometers determined by laser diffraction according to ISO 13320:2009. The copolycarbonate corresponds to the "high heat copolycarbonate" of European Patent Application No. 18206355.2 filed 14 Nov. 2018, and International Patent Application No, PCT/US Ser. No. 19/061,477 filed 14 Nov. 2019, both of which are incorporated herein by reference.

All ranges disclosed herein are inclusive of the endpoints, and the endpoints are independently combinable with each other. Each range disclosed herein constitutes a disclosure of any point or sub-range lying within the disclosed range.

The invention includes at least the following aspects.

Aspect 1: A polycarbonate-polysiloxane comprising, based on 100 mole percent of total carbonate units in the polycarbonate-polysiloxane, 20 to 69.95 mole percent of first carbonate units having the structure

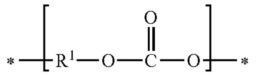

wherein $R^1$ is a $C_6$-$C_{16}$ divalent aromatic group; 30 to 79.95 mole percent of second carbonate units having the structure

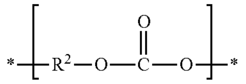

wherein $R^2$ is a $C_{17}$-$C_{40}$ divalent aromatic group having the structure

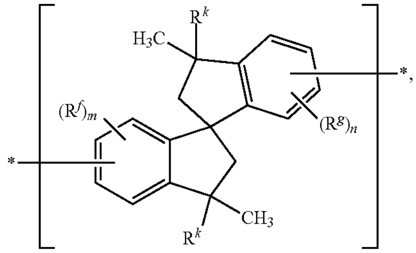

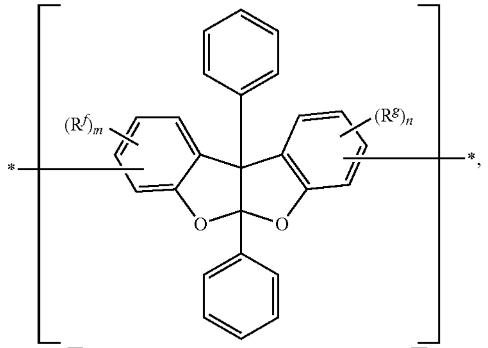

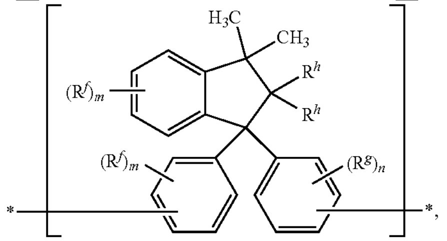

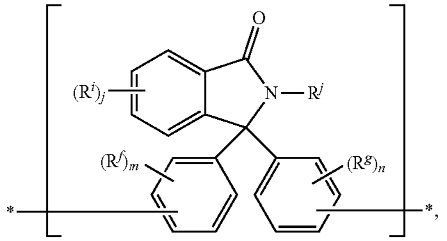

-continued

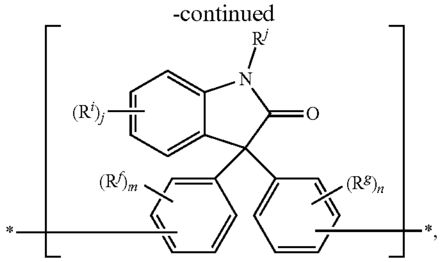

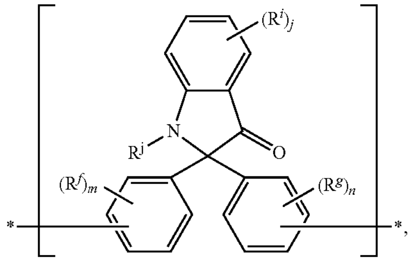

or

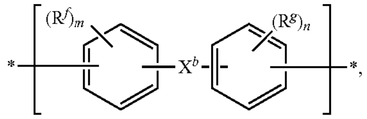

wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^1$ is independently $C_1$-$C_6$ alkyl; RV is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —$C(R^m)(R^n)$— wherein $R^m$ is hydrogen, $C_1$-$C_{12}$ alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0.05 to 0.4 mole percent of third carbonate units, each third carbonate unit comprising a divalent carbonate group and a divalent polysiloxane group, the divalent polysiloxane group comprising 5 to 60 diorganosiloxane units having the structure

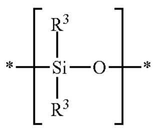

wherein each occurrence of $R^3$ is independently a $C_1$-$C_{13}$ hydrocarbyl group; wherein the polycarbonate-polysiloxane has a weight average molecular weight of 18,000 to 35,000 grams/mole, determined by gel permeation chromatography with bisphenol A polycarbonate standards; and wherein if the polycarbonate-polysiloxane comprises 70 to 79.95 mole percent of the second carbonate units, then the polycarbonate-polysiloxane has a weight average molecular weight of 18,000 to 24,000 grams/mole.

Aspect 2: The polycarbonate-polysiloxane of aspect 1, wherein the first carbonate units have the structure

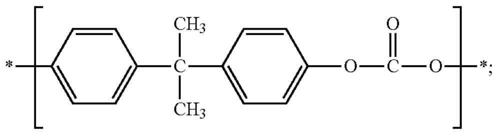

and the second carbonate units have the structure

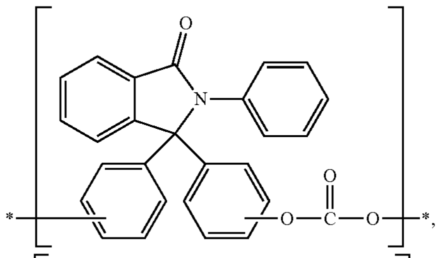

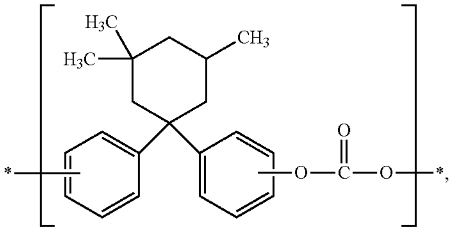

or a combination thereof.

Aspect 3: The polycarbonate-polysiloxane of aspect 1 or 2, wherein the third carbonate units have the structure

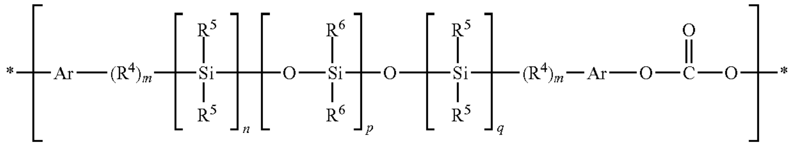

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$, alkyl or $C_6$-$C_{18}$ aryl; m and n and q are independently at each occurrence zero or 1; and p is (30-n-q) to (60-n-q).

Aspect 4: The polycarbonate-polysiloxane of any one of aspects 1-3, comprising 35 to 64.95 mole percent of first carbonate units, 35 to 64.95 mole percent of second carbonate units, and 0.05 to 0.3 mole percent of third carbonate units.

Aspect 5: The polycarbonate-polysiloxane of aspect 1, wherein the first carbonate units have the structure

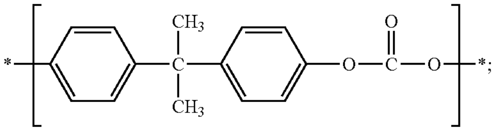

the second carbonate units have the structure

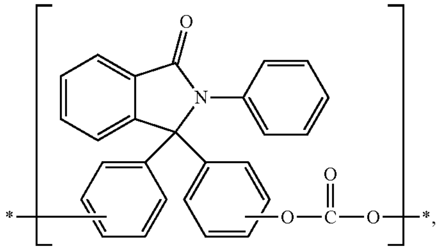

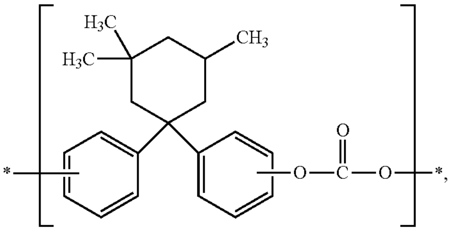

or a combination thereof; the third carbonate units have the structure

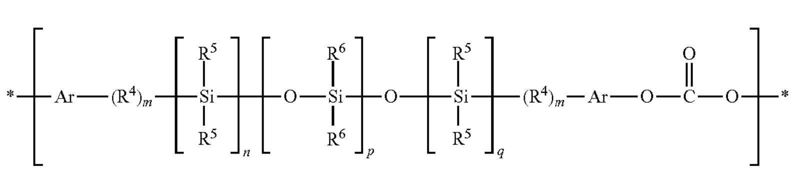

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$, alkyl or $C_6$-$C_{18}$ aryl; m and n and q are independently at each occurrence zero or 1; and p is (30-n-q) to (60-n-q); the polycarbonate-polysiloxane comprises 35 to 64.95 mole percent of first carbonate units, 35 to 64.95 mole percent of second carbonate units, and 0.05 to 0.3 mole percent of third carbonate units; and the polycarbonate-polysiloxane has a weight average molecular weight of 20,000 to 35,000 grams/mole, determined by gel permeation chromatography using bisphenol A polycarbonate standards.

Aspect 6: A composition comprising a polycarbonate-polysiloxane comprising, based on 100 mole percent of total carbonate units in the polycarbonate-polysiloxane: 20 to 69.95 mole percent of first carbonate units having the structure

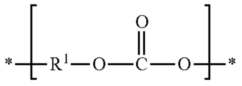

wherein $R^1$ is a $C_6$-$C_{16}$ divalent aromatic group; 30 to 79.95 mole percent of second carbonate units having the structure

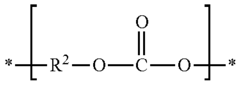

wherein $R^2$ is a $C_{17}$-$C_{40}$ divalent aromatic group having the structure

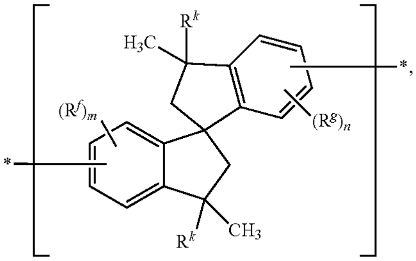

,

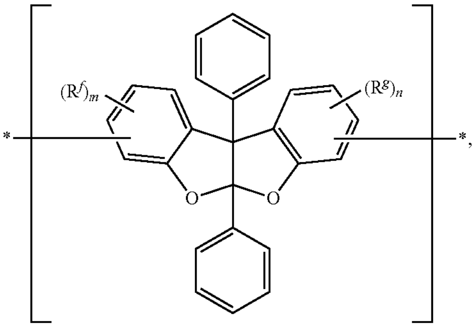

,

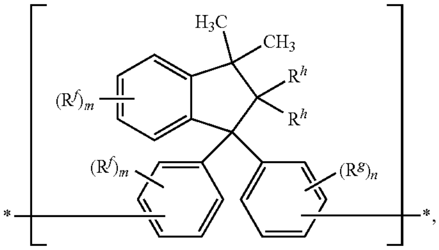

,

-continued

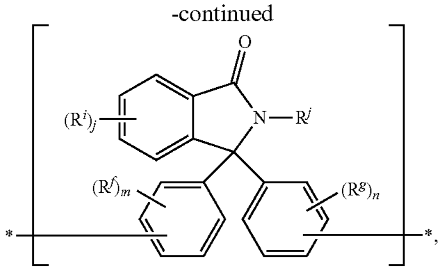

,

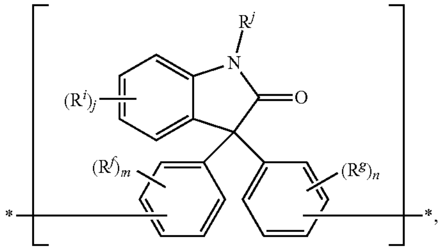

,

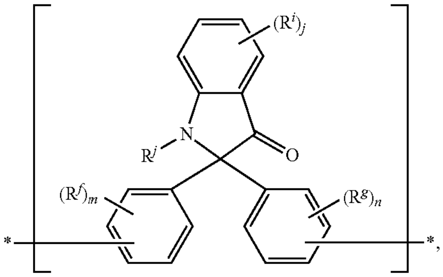

, or

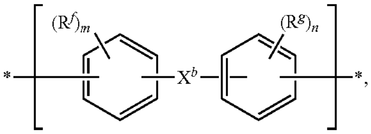

, wherein $R^f$ and $R^g$ are each independently at each occurrence $C_1$-$C_{12}$ alkyl, $C_1$-$C_{12}$ alkoxyl, or $C_2$-$C_{12}$ alkenyl; each $R^h$ is hydrogen or two occurrence of $R^h$ combine with the carbon atom to which they are attached to form a carbonyl group; each occurrence of $R^1$ is independently $C_1$-$C_6$ alkyl; RV is hydrogen, $C_1$-$C_6$ alkyl, or phenyl optionally substituted with 1, 2, 3, 4, or 5 $C_1$-$C_6$ alkyl groups; $R^k$ is independently at each occurrence $C_1$-$C_3$ alkyl or phenyl, preferably methyl; $X^b$ is $C_6$-$C_{12}$ arylene, $C_4$-$C_{18}$ cycloalkylene, $C_4$-$C_{18}$ cycloalkylidene, or —C($R^m$)($R^n$)— wherein $R^m$ is hydrogen, $C_1$-$C_{12}$, alkyl, or $C_6$-$C_{12}$ aryl, and $R^n$ is $C_6$-$C_{10}$ alkyl, $C_6$-$C_8$ cycloalkyl, or $C_6$-$C_{12}$ aryl, or $X^b$ is -$(Q^a)_x$-G-$(Q^b)_y$-, wherein $Q^a$ and $Q^b$ are each independently $C_1$-$C_3$ alkylene, G is $C_3$-$C_{10}$ cycloalkylene, x is zero or 1, and y is zero or 1; and j, m, and n are each independently zero, 1, 2, 3, or 4; and 0.05 to 0.4 mole percent of third carbonate units, each third carbonate unit comprising a divalent carbonate group (—OC(O)O—) and a divalent polysiloxane group, the divalent polysiloxane group comprising 5 to 60 diorganosiloxane units having the structure

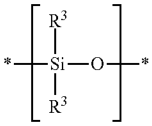

wherein each occurrence of $R^3$ is independently a $C_1$-$C_{13}$ hydrocarbyl group; wherein the polycarbonate-polysiloxane has a weight average molecular weight of 18,000 to 35,000 grams/mole, determined by gel permeation chromatography with bisphenol A polycarbonate standards; and wherein if the polycarbonate-polysiloxane comprises 70 to 79.95 mole percent of the second carbonate units, then the polycarbonate-polysiloxane has a weight average molecular weight of 18,000 to 24,000 grams/mole.

Aspect 7: The composition of aspect 6, wherein the polycarbonate-polysiloxane comprises 35 to 64.95 mole percent of first carbonate units, 35 to 64.95 mole percent of second carbonate units, and 0.05 to 0.3 mole percent of third carbonate units.

Aspect 8: The composition of aspect 6 or 7, comprising, based on the total weight of the composition: 70 to 99.95 weight percent of the polycarbonate-polysiloxane; and 0.05 to 2 weight percent of a roughening agent.

Aspect 9: The composition of aspect 8, wherein the roughening agent comprises a particulate crosslinked polymethylsilsesquioxane having a median equivalent spherical diameter of 0.1 to 10 micrometers determined by laser diffraction according to ISO 13320:2009.

Aspect 10: The composition of aspect 6, wherein the composition comprises 70 to 99.95 weight percent of the polycarbonate-polysiloxane and further comprises 0.05 to 2 weight percent of a roughening agent; the polycarbonate-polysiloxane comprises 35 to 64.95 mole percent of first carbonate units, 35 to 64.95 mole percent of second carbonate units, and 0.05 to 0.3 mole percent of third carbonate units; the first carbonate units have the structure

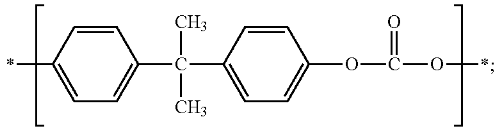

the second carbonate units have the structure

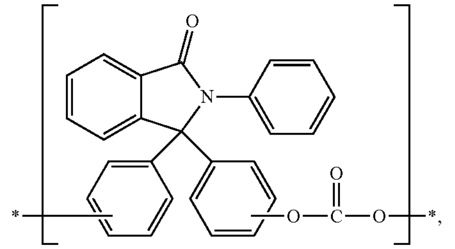

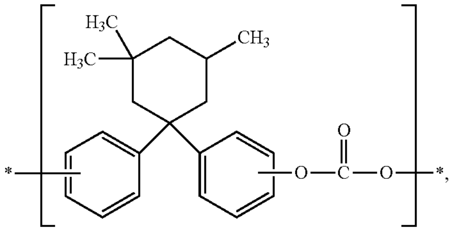

or a combination thereof; the third carbonate units have the structure

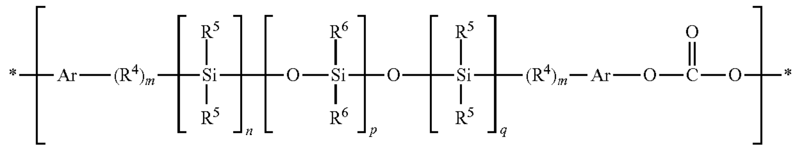

wherein Ar is independently at each occurrence a $C_6$-$C_{24}$ aromatic divalent group optionally substituted with 1, 2, 3, or 4 substituents, each substituent independently selected from the group consisting of halogen, $C_1$-$C_6$ alkyl, and $C_1$-$C_6$ alkoxyl; $R^4$ is independently at each occurrence a $C_2$-$C_8$ divalent aliphatic group; $R^5$ and $R^6$ are independently at each occurrence $C_1$-$C_{12}$, alkyl or $C_6$-$C_{18}$ aryl; m and n and q are independently at each occurrence zero or 1; and p is (30-n-q) to (60-n-q); the polycarbonate-polysiloxane has a weight average molecular weight of 20,000 to 35,000 grams/mole, determined by gel permeation chromatography using bisphenol A polycarbonate standards; and the roughening agent comprises a particulate crosslinked polymethylsilsesquioxane having a median equivalent spherical diameter of 0.1 to 10 micrometers determined by laser diffraction according to ISO 13320:2009.

Aspect 11: An extruded film comprising the composition of any one of aspects 6-10.

Aspect 12: The extruded film of aspect 11, wherein the extruded film has a thickness of 2 to 15 micrometers; and wherein the composition comprises, based on the total weight of the composition, 70 to 99.95 weight percent of the polycarbonate-polysiloxane, and 0.05 to 2 weight percent of a roughening agent comprising a particulate crosslinked polymethylsilsesquioxane having a median equivalent spherical diameter of 0.1 to 10 micrometers determined by laser diffraction according to ISO 13320:2009.

Aspect 13: A capacitor comprising: an extruded film comprising the composition of any one of aspects 6-10; and an electrically conductive metal layer in contact with the extruded film.

Aspect 14: A metallized film comprising: an extruded film comprising the composition of any one of aspects 6-10; and an electrically conductive metal layer in contact with the extruded film.

Aspect 15: A composition comprising, based on the total weight of the composition: 65 to 99.95 weight percent of a copolycarbonate comprising first carbonate units derived from a first bisphenol monomer such that a homopolycarbonate of the first bisphenol monomer has a glass transition temperature less than 155° C. determined by dynamic mechanical analysis according to ASTM E1640-13 at a heating rate of 1° C./minute, and second carbonate units derived from a second bisphenol monomer such that a homopolycarbonate of the second bisphenol monomer has a glass transition temperature of 155° C. or higher determined by dynamic mechanical analysis according to ASTM E1640-13 at a heating rate of 1° C./minute; and 0.05 to 2 weight percent of a roughening agent comprising a particulate crosslinked polymethylsilsesquioxane having a median equivalent spherical diameter greater than 5 micrometers and less than or equal to 10 micrometers determined by laser diffraction according to ISO 13320:2009.

The invention is further illustrated by the following non-limiting examples.

Examples

Materials used in these experiments are summarized in Table 1.

The following is a procedure for synthesizing a polycarbonate copolymer containing about 62.5 mole percent of bisphenol isophorone (BPI) carbonate units, about 37.34 mole percent of bisphenol A (BPA) carbonate units, and about 0.16 mole percent of D45 carbonate units. Polycarbonate copolymers containing different proportions of the same carbonate units can be synthesized by varying the proportions of the respective monomers. A reactor was equipped with an overhead condenser, an agitator, and a circulation pump. Methylene chloride (18 liters), BPI (3157 grams), BPA (1393 grams), D45 (91 grins). water (10 liters), triethylamine (30 grams), and sodium gluconate (10 grams) were charged to the reactor. A para-cumylphenol (PCP; 112 grams) solution in methylene chloride (800 grams) was fed to the reactor at 200 grams/minute. Phosgene gas (2650 grams) was bubbled through the reactor at 90 grams/minute and the pH was maintained between 9 and 10 with the addition of 33 weight percent aqueous sodium hydroxide while the solution was rigorously agitated. Upon completion of the phosgene addition, the reaction mixture was allowed to stir for 10 minutes while the pH stabilized at 9. A sample of the reaction product was analyzed by gel permeation chromatography (GPC) using bisphenol. A polycarbonate standards and found to have a weight average molecular weight ($M_w$) of 28,665 grams/mole and a number average molecular weight ($M_n$) of 10,254 grams/mole. The reactor was purged with nitrogen for 5 minutes, then the contents were discharged to a feed tank. The mixture was fed to a train of liquid-liquid centrifuges where the brine phase was separated from the polymer solution in methylene chloride. Triethylamine was removed by washing the polymer solution with 1 weight percent aqueous hydrochloric acid, and residual ions were removed by washing with water. The purified polymer solution was transferred to a feed pot. The resin was isolated by contacting the polymer solution with steam through a precipitation jet to flash off the methylene chloride leaving a white wet cake. Water was removed from the resin by placing it in a cone shaped dryer and passing heated nitrogen through the powder for four hours. The yield of isolated resin powder was 10.2 kilograms, GPC analysis of the isolated resin yielded a $M_w$ of 28,256 grams/mole, and ultra-high performance liquid chromatographic analysis of a copolymer hydrolysate (obtained by reaction of terpolymer with potassium hydroxide) yielded a BPI content of 63 mole percent.

TABLE 1

| Material | Description |
|---|---|
| BPI/BPA 1 | p-Cumylphenol-endcapped polycarbonate containing 20 mole percent bisphenol A (BPA) carbonate units and 80 mole percent bisphenol isophorone (BPI) carbonate units; the copolymer having a weight average molecular weight of 24,000 grams/mole determined by gel permeation chromatography using BPA polycarbonate standards. |
| BPI/BPA 2 | p-Cumylphenol-endcapped polycarbonate containing 20 mole percent BPA carbonate units and 80 mole percent BPI carbonate units; the copolymer having a weight average molecular weight of 21,500 grams/mole determined by gel permeation chromatography using BPA polycarbonate standards. |
| BPI/BPA 3 | p-Cumylphenol-endcapped polycarbonate containing 20 mole percent BPA carbonate units and 80 mole percent BPI carbonate units; the copolymer having a weight average molecular weight of 28,000 grams/mole determined by gel permeation chromatography using BPA polycarbonate standards. |
| BPI/BPA 4 | p-Cumylphenol-endcapped polycarbonate containing 55 mole percent BPA carbonate units and 45 mole percent BPI carbonate units, the copolymer having a weight average molecular weight of 25,000 grams/mole determined by gel permeation chromatography using BPA polycarbonate standards. |
| BPI/BPA 5 | p-Cumylphenol-endcapped polycarbonate containing 55 mole percent BPA carbonate units and 45 mole percent BPI carbonate units, the copolymer having a weight average molecular weight of 28,000 grams/mole determined by gel permeation chromatography using BPA polycarbonate standards. |
| BPI/BPA 6 | p-Cumylphenol-endcapped polycarbonate containing 43 mole percent BPA carbonate units and 57 mole percent BPI carbonate units, the |

TABLE 1-continued

| Material | Description |
|---|---|
| | copolymer having a weight average molecular weight of 28,000 grams/mole determined by gel permeation chromatography using BPA polycarbonate standards. |
| BPI/BPA 7 | p-Cumylphenol-endcapped polycarbonate containing 37.5 mole percent BPA carbonate units and 62.5 mole percent BPI carbonate units, the copolymer having a weight average molecular weight of 25,000 grams/mole determined by gel permeation chromatography using BPA polycarbonate standards. |
| BPI/BPA 8 | p-Cumylphenol-endcapped polycarbonate containing 42 mole percent BPA carbonate units and 58 mole percent BPI carbonate units, the copolymer having a weight average molecular weight of 28,000 grams/mole determined by gel permeation chromatography using BPA polycarbonate standards. |
| BPI/BPA/Silox 1 | p-Cumylphenol-endcapped polycarbonate-polysiloxane with 1 weight percent of polysiloxane carbonate units having an average of about 45 dimethylsiloxane units per carbonate unit, and 99 weight percent total of BPA carbonate units and BPI (BPI) carbonate units, the BPA carbonate units and BPI carbonate units being present in a mole ratio of 20:80 (equivalent to 75.081 mole percent BPI carbonate units, 24.834 mole percent BPA carbonate units, and 0.086 mole percent polysiloxane carbonate units, all based on total moles of carbonate units in the polycarbonate-polysiloxane); the polycarbonate-polysiloxane having a weight average molecular weight of 22,000 grams/mole determined by gel permeation chromatography using BPA polycarbonate standards. |
| BPI/BPA/Silox 2 | p-Cumylphenol-endcapped polycarbonate-polysiloxane with 2 weight percent of polysiloxane carbonate units having an average of about 45 dimethylsiloxane units per carbonate unit, and 98 weight percent total of BPA carbonate units and BPI carbonate units, the BPA carbonate units and BPI carbonate units being present in a mole ratio of 20:80 (equivalent to 75.015 mole percent BPI carbonate units, 24.812 mole percent BPA carbonate units, and 0.173 mole percent polysiloxane carbonate units, all based on total moles of carbonate units in the polycarbonate-polysiloxane); the polycarbonate-polysiloxane having a weight average molecular weight of 22,000 grams/mole determined by gel permeation chromatography using BPA polycarbonate standards. |
| BPI/BPA/Silox 3 | p-Cumylphenol-endcapped polycarbonate-polysiloxane with 5 weight percent of polysiloxane carbonate units having an average of about 45 dimethylsiloxane units per carbonate unit, and 95 weight percent total of BPA carbonate units and BPI carbonate units, the BPA carbonate units and BPI carbonate units being present in a mole ratio of 20:80 (equivalent to 74.811 mole percent BPI carbonate units, 24.744 mole percent BPA carbonate units, and 0.445 mole percent polysiloxane carbonate units, all based on total moles of carbonate units in the polycarbonate-polysiloxane); the polycarbonate-polysiloxane having a weight average molecular weight of 28,000 grams/mole determined by gel permeation chromatography using BPA polycarbonate standards. |
| BPI/BPA/Silox 4 | p-Cumylphenol-endcapped polycarbonate-polysiloxane with 2 weight percent of polysiloxane carbonate units having an average of about 45 dimethylsiloxane units per carbonate unit, and 98 weight percent total of BPA carbonate units and BPI carbonate units, the BPA carbonate units and BPI carbonate units being present in a mole ratio of 20:80 (equivalent to 75.015 mole percent BPI carbonate units, 24.812 mole percent BPA carbonate units, and 0.173 mole percent polysiloxane carbonate units, all based on total moles of carbonate units in the polycarbonate-polysiloxane); the polycarbonate-polysiloxane having a weight average molecular weight of 28,000 grams/mole determined by gel permeation chromatography using BPA polycarbonate standards. |
| BPI/BPA/Silox 5 | p-Cumylphenol-endcapped polycarbonate-polysiloxane with 2 weight percent of polysiloxane carbonate units having an average of about 45 dimethylsiloxane units per carbonate unit, and 98 weight percent total of BPA carbonate units and BPI carbonate units, the BPA carbonate units and BPI carbonate units being present in a mole ratio of 55:45 (equivalent to 38.151 mole percent BPI carbonate units, 61.692 mole percent BPA carbonate units, and 0.156 mole percent polysiloxane carbonate units, all based on total moles of carbonate units in the polycarbonate-polysiloxane); the polycarbonate-polysiloxane having a weight average molecular weight of 25,000 grams/mole determined by gel permeation chromatography using BPA polycarbonate standards. |
| BPI/BPA/Silox 6 | p-Cumylphenol-endcapped polycarbonate-polysiloxane with 2 weight percent of polysiloxane carbonate units having an average of about 45 dimethylsiloxane units per carbonate unit, and 98 weight percent total of BPA carbonate units and BPI carbonate units, the BPA carbonate units and BPI carbonate units being present in a mole ratio of 55:45 (equivalent to 38.151 mole percent BPI carbonate units, 61.692 mole percent BPA carbonate units, and 0.156 mole percent polysiloxane carbonate units, all based on total moles of carbonate units in the polycarbonate-polysiloxane); the polycarbonate-polysiloxane having a |

TABLE 1-continued

| Material | Description |
|---|---|
| | weight average molecular weight of 28,000 grams/mole determined by gel permeation chromatography using BPA polycarbonate standards. |
| BPI/BPA/Silox 7 | p-Cumylphenol-endcapped polycarbonate-polysiloxane with 2 weight percent of polysiloxane carbonate units having an average of about 45 dimethylsiloxane units per carbonate unit, and 98 weight percent total of BPA carbonate units and BPI carbonate units, the BPA carbonate units and BPI carbonate units being present in a mole ratio of 37.5:62.5 (equivalent to 55.655 mole percent BPI carbonate units, 44.180 mole percent BPA carbonate units, and 0.164 mole percent polysiloxane carbonate units, all based on total moles of carbonate units in the polycarbonate-polysiloxane); the polycarbonate-polysiloxane having a weight average molecular weight of 25,000 grams/mole determined by gel permeation chromatography using BPA polycarbonate standards. |
| BPI/BPA/Silox 8 | p-Cumylphenol-endcapped polycarbonate-polysiloxane with 2 weight percent of polysiloxane carbonate units having an average of about 45 dimethylsiloxane units per carbonate unit, and 98 weight percent total of BPA carbonate units and BPI carbonate units, the BPA carbonate units and BPI carbonate units being present in a mole ratio of 37.5:62.5 (equivalent to 55.655 mole percent BPI carbonate units, 44.180 mole percent BPA carbonate units, and 0.164 mole percent polysiloxane carbonate units, all based on total moles of carbonate units in the polycarbonate-polysiloxane); the polycarbonate-polysiloxane having a weight average molecular weight of 28,000 grams/mole determined by gel permeation chromatography using BPA polycarbonate standards. |
| BPI/BPA/Silox 9 | p-Cumylphenol-endcapped polycarbonate-polysiloxane with 2 weight percent of polysiloxane carbonate units having an average of about 45 dimethylsiloxane units per carbonate unit, and 98 weight percent total of BPA carbonate units and BPI carbonate units, the BPA carbonate units and BPI carbonate units being present in a mole ratio of 20:80 (equivalent to 75.015 mole percent BPI carbonate units, 24.812 mole percent BPA carbonate units, and 0.173 mole percent polysiloxane carbonate units, all based on total moles of carbonate units in the polycarbonate-polysiloxane); the polycarbonate-polysiloxane having a weight average molecular weight of 25,000 grams/mole determined by gel permeation chromatography using BPA polycarbonate standards. |
| BPI/BPA/Silox 10 | p-Cumylphenol-endcapped polycarbonate-polysiloxane with 5 weight percent of polysiloxane carbonate units having an average of about 45 dimethylsiloxane units per carbonate unit, and 95 weight percent total of BPA carbonate units and BPI carbonate units, the BPA carbonate units and BPI carbonate units being present in a mole ratio of 20:80 (equivalent to 74.811 mole percent BPI carbonate units, 24.744 mole percent BPA carbonate units, and 0.445 mole percent polysiloxane carbonate units, all based on total moles of carbonate units in the polycarbonate-polysiloxane); the polycarbonate-polysiloxane having a weight average molecular weight of 28,000 grams/mole determined by gel permeation chromatography using BPA polycarbonate standards. |
| PMSS | Particulate crosslinked polymethylsilsesquioxane, having an average particle size of 0.5 micrometer as determined by scanning electron microscopy; available as XC99-A8808 Silicone Beads from Momentive. |
| PETS | Pentaerythritol tetrastearate, CAS Reg. No. 115-83-3. |
| AO | Tris(2,4-di-tert-butylphenyl)phosphite, CAS Reg. No. 31570-04-4; available as IRGAFOS ™ 168 from Ciba. |

Table 2 summarizes film extrusion composition characteristics and film properties. In Table 2, "Copolymer" refers to the copolymer used in the film extrusion composition (copolymer descriptions are in Table 1); "Polysiloxane carbonate (mol %)" is the mole percent of polysiloxane carbonate units based on the total of all carbonate units in the copolymer; "BPI carbonate (mol %)" is the mole percent of BPI carbonate units based on the total of all carbonate units in the copolymer; "BPA carbonate (mol %)" is the mole percent of BPA carbonate units based on the total of all carbonate units in the copolymer; and "$M_w$ (kg/mol)" is the weight average molecular weight of the copolymer. Each film extrusion composition contained 99.34 weight percent of the specified copolymer, 0.3 weight percent of PETS, 0.3 weight percent of PMSS-2, and 0.06 weight percent of AO. All compositions were compounded on a Werner & Pfleiderer co-rotating twin-screw extruder having a Length-to-Diameter ratio of 30:1 and a vacuum port located near the die face. Compounding was conducted at a temperature of 285-330° C.

Films were extruded using a 25 millimeter single-screw extruder utilizing a melt pump to eliminate pulsating melt flow. The melt pump was adjusted to provide optimum melt pressure in the die at temperatures of 330-360° C. The melt was extruded through a vertical 450 millimeter wide t-die with a die gap clearance of 100-300 micrometers. The melt curtain was cast onto a polished chill roll and drawn down in the machine direction to the thickness specified in Table 2. Gauge was controlled by matching the melt pump output and take-up speed of the downstream equipment to provide uniform constant film thickness.

Film properties are summarized in Table 2. "Processability" indicates how easily a film can be extruded from the extrusion composition. A rating of zero means that the composition could not be processed to form a 5 micrometer thick extruded film; a rating of 1 means that the composition was difficult to process to form a 5 micrometer thick extruded film; a rating of 2 means that the composition could be consistently processed to form a 5 micrometer thick extruded film; and a rating of 3 means that the composition could be consistently processed to form a 3 micrometer thick extruded film. A rating of 2 or 3 is preferred and is predictive of a robust processing window for formation of thin gauge films for capacitor applications.

Tensile elongation (having units of % gauge length), tensile stress at break (megapascals), and tensile modulus (megapascals) were evaluated according to ASTM D882-02 at 23° C. on 5 micrometer thick extruded films in machine and transverse directions. Higher tensile stress at break is predictive of better film handling through the extrusion, metallization, and cap winding processes of film capacitor fabrication.

Tear strength (having units of Newtons/millimeter) was evaluated according to ISO 6383-1 at 23° C. on 5 micrometer thick extruded films in machine and transverse directions. Test parameters were as follows: (1) test rate: 200 mm/sec; (2) test extension: 50 millimeters; (3) load cell: 10 Newtons; (4) 5 runs reported per sample; (5) Instron Test Rack with Bluehill 3 software; (6) film sample size: 25 millimeter by 200 millimeter strips; (7) 30 millimeter cut made in short end of sample to initiate tear site; (8) each leg of sample mounted using pneumatic grips; (9) static was removed from sample using deionized air gun; and (10) average tear was calculated from area of load/extension curve selected by operator. Higher tear strength is predictive of better film handling through the extrusion, metallization, and cap winding processes of film capacitor fabrication.

"Slip Rating" and "Slip Rank" are subjective measures of the slipperiness of the surface of an extruded film. Slip ratings range from 1 (sticky) to 3 (slippery), and the displayed value is the average of ratings from five evaluators. Slip rank is the forced ranking among 18 samples, with 1 being the best and 18 being the worst; the displayed value is the average of rankings from five evaluators. Slip is essential for good handling of the film web through the extrusion process, metallization, capacitor winding, and capacitor flattening processes. Too little slip causes blocking and wrinkling in the extrusion process and the inability to flatten capacitor windings. Too much slip creates problems in metallization handling, and telescoping and tracking issues during unwind and rewind in metallization.

Surface roughness is an important physical property of the film which impacts slip directly and is essential for good handling of film web through the extrusion process, film metallization, and capacitor winding. Inadequate surface roughness can cause blocking and also air entrapment between the windings of the subsequent layers of film in the master roll during extrusion. Trapped gas is a primary cause of telescoping during metallization. Excessive surface roughness drops the efficiency of the wound capacitor (volume to energy ratings) and reduces the breakdown strength of the film. Surface roughness properties (all having units of micrometers) were determined according to JIS B0601:1994. "Ra" is the arithmetic mean roughness; "Ry" is the maximum height; "Rz" is the cross point average height; "S" is the average local maximum interval; "Sm" is the average irregularity interval; and "RMS" is the root mean square roughness. Values in Table 2 represent the average of values from five samples. Surface roughness properties were determined using a Keyence confocal microscope. The primary roughness image was captured on the Keyence VK-200 using a 50X objective. The sample was mounted on a flat polycarbonate plaque to minimize surface departure. The top surface of film was brought into focus using the stage height adjustment in laser measurement mode. The scan range was set manually to 1 micrometer above the film top surface to 1 micrometer below the film top surface. The total scan range did not exceed film thickness. The target Z scan range was 2-4 micrometers to ensure that the bottom side of the film was not imaged during data collection. If the entire field of view could not be captured within the targeted scan range, the sample was moved in the X and Y direction to ensure a flat image was acquired. Once the scan range was set, auto gain was implemented to establish acceptable brightness and contrast settings throughout total scan range. The double scan option was used under high accuracy settings. The Z step height was 0.1 micrometer. The measurement was made under these settings using a 50X objective providing a 280-300 millimeter by 200 millimeter field of view for data analysis. Five separate measurements were made using one 50 millimeter by 100 millimeter sample at various locations. Surface roughness measurements were made in accordance to JIS B0601:1994 standard calculations on each image. A template for multi-line scan analysis was used to calculate and report the average value determined for each of the five individual scans. The analysis included 60 lines across each image in the machine direction and was reported as an average for Ra (arithmetic mean roughness), Ry (maximum height), Rz (cross point average height), and RMS (root mean square roughness). Preprocessing of the acquired images included the following steps in accordance with Keyence recommendations: auto tilt correction; auto noise elimination; height cut level; and DCL/BCL level. Roughness curve correction: Height data was generated by taking a roughness measurement on the tilt-corrected surface. This allowed the surface roughness to be determined from the line roughness cross section curve. Surface roughness determined a baseline by using the least squares method on the height data and determined the distance from that baseline of each height data point. The Ra calculation determined the absolute value of the height difference between the reference surface and the measured surface, then determined the average of the distance between each dot on the roughness curve surface and the reference surface. The Ry calculation was performed by determining the sum of the height of the highest peak (Yp) and the depth of the lowest valley (Yv) by comparing the distance between the reference surface and each point on the roughness curve surface. The Rz value was determined from the sum of the average of the absolute values of heights of the five highest peaks and the average of the absolute values of depths of the five lowest valleys. The RMS calculation indicated the square root of the sum of the squares of the difference between the reference surface and the roughness curve surface.

Electrical properties were determined using the Bosch test. The Bosch test is a continuous electrical break down test procedure and apparatus that can measure the number of breakdowns in a film that occurs at a specified voltage per unit thickness. The lower the clearing counts at each voltage level, the higher the quality of the film (i.e., lower defects, scratches, wrinkles, and thickness non-uniformities). Electrical clearing counts were determined at 150, 200, 250, 300, 350, 400, 450, and 500 volts/micrometer. A film to be tested was sandwiched between a grounded metalized layer on a counter electrode film and a polished steel roller. The film under test and the corresponding grounded metalized film (counter electrode) were wound through the apparatus at 10 meters per minute in a roll-to-roll process. The electrical potential of the high potential roller was controlled using BK Precision1788B power supply in conjunction with a TREK 20/20C amplifier. A Labview software control interface was used in conjunction with a National Instruments NI-9223 voltage input module to measure voltage/current spikes at specified voltages to determine the number of breakdown counts. The number and location of the breakdown counts was recorded for 1 square meter of film at each voltage. Clearing count values in Table 2 represent an average of five tests per sample. No results are presented for Comparative Example 2 because it was not possible to extrude a film thinner than 19 micrometers. For Examples 5-7, no results are presented for voltages of 450 and 500 volts/micrometer. For these samples, so many counts were observed at 400 volts/micrometer that the operator stopped the test.

The property results in Table 2 illustrate that the inventive examples exhibit not only good processability, but also a desirable balance of processability, tensile strength, tear strength, surface roughness, and electrical resistance. Relative to the comparative examples in which the polycarbonate-polysiloxanes have greater polysiloxane content, the inventive examples generally exhibit improved processability. Relative to the comparative examples incorporating polycarbonate copolymers lacking polysiloxane content, the inventive examples with polycarbonate-polysiloxanes, particularly those in which the polycarbonate-polysiloxanes having lower contents of BPI carbonate, generally exhibit improved processability, electrical performance, and slip properties.

TABLE 2

| Copolymer | C. Ex. 1 BPI/BPA 1 | C. Ex. 2 BPI/BPA 2 | Ex. 1 BPI/BPA/Silox 1 |
|---|---|---|---|
| Polysiloxane carbonate (mol %) | 0 | 0 | 0.086 |
| BPI carbonate (mol %) | 80 | 80 | 75.081 |
| BPA carbonate (mol %) | 20 | 20 | 24.834 |
| $M_w$ (kg/mol) | 24 | 21.5 | 22 |
| Film thickness (μm) | 5 | 5 | 5 |
| Processability | 3 | 3 | 2 |
| Machine direction tensile elongation (%) | 5.35 | 3.70 | 2.88 |
| Machine direction tensile stress (MPa) | 66.5 | 65.8 | 58.0 |
| Machine direction tensile modulus (MPa) | 2152 | 2577 | 2415 |
| Transverse direction tensile elongation (%) | 2.43 | 3.03 | 1.87 |
| Transverse direction tensile stress (MPa) | 45.3 | 57.2 | 39.3 |
| Transverse direction tensile modulus (MPa) | 2209 | 2402 | 2281 |
| Machine direction tear strength (N/mm) | 0.323 | 0.487 | 0.672 |
| Transverse direction tear strength (N/mm) | 0.416 | 0.529 | 0.602 |
| Slip Rating | 2 | 2.3 | 2 |
| Slip Rank | 11.5 | 17.25 | 8 |
| Ra (μm) | 0.028 | 0.042 | 0.052 |
| Ry (μm) | 0.188 | 0.244 | 0.284 |
| Rz (μm) | 0.100 | 0.100 | 0.092 |
| S (μm) | 13.252 | 16.728 | 21.326 |
| Sm (μm) | 1.274 | 1.284 | 1.292 |
| RMS (μm) | 0.036 | 0.052 | 0.06 |
| Clearing counts at 150 V/μm (counts/$m^2$) | 0 | 0 | 0.2 |
| Clearing counts at 200 V/μm (counts/$m^2$) | 0 | 0 | 0.6 |
| Clearing counts at 250 V/μm (counts/$m^2$) | 0 | 0.6 | 9.2 |
| Clearing counts at 300 V/μm (counts/$m^2$) | 5.2 | 1.4 | 32.8 |
| Clearing counts at 350 V/μm (counts/$m^2$) | 16.4 | 6.2 | 108 |
| Clearing counts at 400 V/μm (counts/$m^2$) | 62.8 | 17.0 | 299 |
| Clearing counts at 450 V/μm (counts/$m^2$) | 265 | 54.2 | 870 |
| Clearing counts at 500 V/μm (counts/$m^2$) | 786 | 197 | 829 |

| Copolymer | Ex. 2 BPI/BPA/Silox 2 | C. Ex. 3 BPI/BPA 3 | C. Ex. 4 BPI/BPA 4 |
|---|---|---|---|
| Polysiloxane carbonate (mol %) | 0.173 | 0 | 0 |
| BPI carbonate (mol %) | 75.015 | 80 | 45 |
| BPA carbonate (mol %) | 24.812 | 20 | 55 |
| $M_w$ (kg/mol) | 22 | 28 | 25 |
| Film thickness (μm) | 5 | 5 | 5 |
| Processability | 2 | 1 | 3 |
| Machine direction tensile elongation (%) | 3.41 | 6.18 | 1.67 |
| Machine direction tensile stress (MPa) | 57.6 | 76.7 | 29.6 |
| Machine direction tensile modulus (MPa) | 2169 | 2582 | 1859 |
| Transverse direction tensile elongation (%) | 1.98 | 2.92 | 2.38 |
| Transverse direction tensile stress (MPa) | 40.7 | 54.8 | 39.2 |
| Transverse direction tensile modulus (MPa) | 2271 | 2331 | 1860 |
| Machine direction tear strength (N/mm) | 0.693 | 1.542 | 1.431 |
| Transverse direction tear strength (N/mm) | 0.698 | 1.262 | 1.152 |
| Slip Rating | 2.25 | 1.5 | 2 |
| Slip Rank | 12.25 | 3.75 | 6 |
| Ra (μm) | 0.038 | 0.042 | 0.036 |
| Ry (μm) | 0.222 | 0.246 | 0.226 |
| Rz (μm) | 0.088 | 0.092 | 0.096 |
| S (μm) | 14.776 | 15.752 | 15.36 |
| Sm (μm) | 1.258 | 1.268 | 1.25 |
| RMS (μm) | 0.046 | 0.05 | 0.044 |
| Clearing counts at 150 V/μm (counts/$m^2$) | 0 | 5.5 | 2.4 |
| Clearing counts at 200 V/μm (counts/$m^2$) | 0.2 | 11 | 5.2 |
| Clearing counts at 250 V/μm (counts/$m^2$) | 0.2 | 17.8 | 12.6 |
| Clearing counts at 300 V/μm (counts/$m^2$) | 15.4 | 52.3 | 39.2 |

TABLE 2-continued

| | | | |
|---|---|---|---|
| Clearing counts at 350 V/μm (counts/$m^2$) | 34.8 | 109 | 194 |
| Clearing counts at 400 V/μm (counts/$m^2$) | 108 | 387 | 695 |
| Clearing counts at 450 V/μm (counts/$m^2$) | 379 | 908 | — |
| Clearing counts at 500 V/μm (counts/$m^2$) | 883 | 834 | — |

| Copolymer | C. Ex. 5 BPI/BPA 5 | C. Ex. 6 BPI/BPA 6 | C. Ex. 7 BPI/BPA 7 |
|---|---|---|---|
| Polysiloxane carbonate (mol %) | 0 | 0 | 0 |
| BPI carbonate (mol %) | 45 | 57 | 62.5 |
| BPA carbonate (mol %) | 55 | 43 | 37.5 |
| $M_w$ (kg/mol) | 28 | 28 | 25 |
| Film thickness (μm) | 5 | 5 | 5 |
| Processability | 3 | 2 | 2 |
| Machine direction tensile elongation (%) | 7.39 | 5.74 | 3.56 |
| Machine direction tensile stress (MPa) | 67.8 | 64.6 | 65.4 |
| Machine direction tensile modulus (MPa) | 2313 | 2006 | 2391 |
| Transverse direction tensile elongation (%) | 2.80 | 3.58 | 3.32 |
| Transverse direction tensile stress (MPa) | 44.0 | 52.2 | 59.0 |
| Transverse direction tensile modulus (MPa) | 2040 | 2008 | 2307 |
| Machine direction tear strength (N/mm) | 1.083 | 0.950 | 0.516 |
| Transverse direction tear strength (N/mm) | 1.086 | 0.908 | 0.690 |
| Slip Rating | 1.95 | 2 | 2 |
| Slip Rank | 9.75 | 7.25 | 7.5 |
| Ra (μm) | 0.034 | 0.04 | 0.038 |
| Ry (μm) | 0.208 | 0.25 | 0.242 |
| Rz (μm) | 0.104 | 0.104 | 0.102 |
| S (μm) | 13.336 | 16.822 | 16.004 |
| Sm (μm) | 1.294 | 1.406 | 1.282 |
| RMS (μm) | 0.04 | 0.05 | 0.048 |
| Clearing counts at 150 V/μm (counts/$m^2$) | 0.4 | 3.4 | 0 |
| Clearing counts at 200 V/μm (counts/$m^2$) | 1.0 | 16.0 | 0 |
| Clearing counts at 250 V/μm (counts/$m^2$) | 8.2 | 14.6 | 1 |
| Clearing counts at 300 V/μm (counts/$m^2$) | 50.8 | 36.6 | 8 |
| Clearing counts at 350 V/μm (counts/$m^2$) | 315 | 56.0 | 39.8 |
| Clearing counts at 400 V/μm (counts/$m^2$) | 860 | 123 | 150 |
| Clearing counts at 450 V/μm (counts/$m^2$) | — | — | 470 |
| Clearing counts at 500 V/μm (counts/$m^2$) | — | — | 910 |

| Copolymer | C. Ex. 8 BPI/BPA/Silox 3 | C. Ex. 9 BPI/BPA/Silox 4 | Ex. 3 BPI/BPA/Silox 5 |
|---|---|---|---|
| Polysiloxane carbonate (mol %) | 0.445 | 0.173 | 0.156 |
| BPI carbonate (mol %) | 74.811 | 75.015 | 38.151 |
| BPA carbonate (mol %) | 24.744 | 24.812 | 61.692 |
| $M_w$ (kg/mol) | 28 | 28 | 25 |
| Film thickness (μm) | 19 | 5 | 5 |
| Processability | 0 | 0 | 3 |
| Machine direction tensile elongation (%) | 5.40 | 4.63 | 4.11 |
| Machine direction tensile stress (MPa) | 61.3 | 59.8 | 61.5 |
| Machine direction tensile modulus (MPa) | 1869 | 1890 | 2117 |
| Transverse direction tensile elongation (%) | 4.60 | 2.63 | 1.57 |
| Transverse direction tensile stress (MPa) | 55.6 | 50.2 | 32.3 |
| Transverse direction tensile modulus (MPa) | 1851 | 2182 | 1967 |
| Machine direction tear strength (N/mm) | 0.654 | 0.421 | 0.828 |
| Transverse direction tear strength (N/mm) | 1.055 | 0.524 | 0.790 |
| Slip Rating | 2.55 | 2.95 | 2.25 |
| Slip Rank | 17.75 | 16.75 | 9.25 |
| Ra (μm) | 0.024 | 0.05 | 0.038 |
| Ry (μm) | 0.15 | 0.268 | 0.244 |
| Rz (μm) | 0.078 | 0.088 | 0.114 |
| S (μm) | 21.1 | 20.206 | 16.016 |
| Sm (μm) | 1.388 | 1.28 | 1.306 |
| RMS (μm) | 0.028 | 0.058 | 0.05 |
| Clearing counts at 150 V/μm (counts/$m^2$) | — | 0 | 0 |
| Clearing counts at 200 V/μm (counts/$m^2$) | — | 0.2 | 1 |
| Clearing counts at 250 V/μm (counts/$m^2$) | — | 0.2 | 2.4 |
| Clearing counts at 300 V/μm (counts/$m^2$) | — | 0.6 | 13.4 |
| Clearing counts at 350 V/μm (counts/$m^2$) | — | 1.2 | 65.4 |
| Clearing counts at 400 V/μm (counts/$m^2$) | — | 2.2 | 186 |
| Clearing counts at 450 V/μm (counts/$m^2$) | — | 4.6 | 555 |
| Clearing counts at 500 V/μm (counts/$m^2$) | — | 9.8 | 831 |

| Copolymer | Ex. 4 BPI/BPA/Silox 6 | Ex. 5 BPI/BPA/Silox 7 | Ex. 6 BPI/BPA/Silox 8 |
|---|---|---|---|
| Polysiloxane carbonate (mol %) | 0.156 | 0.164 | 0.164 |
| BPI carbonate (mol %) | 38.151 | 55.655 | 55.655 |
| BPA carbonate (mol %) | 61.692 | 44.180 | 44.180 |
| $M_w$ (kg/mol) | 28 | 25 | 28 |

TABLE 2-continued

| | | | |
|---|---|---|---|
| Film thickness (μm) | 5 | 5 | 5 |
| Processability | 3 | 2 | 2 |
| Machine direction tensile elongation (%) | 5.50 | 4.81 | 6.56 |
| Machine direction tensile stress (MPa) | 68.7 | 58.6 | 68.3 |
| Machine direction tensile modulus (MPa) | 2213 | 1934 | 2195 |
| Transverse direction tensile elongation (%) | 1.47 | 2.12 | 2.73 |
| Transverse direction tensile stress (MPa) | 30.6 | 39.7 | 48.8 |
| Transverse direction tensile modulus (MPa) | 2082 | 1931 | 2074 |
| Machine direction tear strength (N/mm) | 0.909 | 1.345 | 1.283 |
| Transverse direction tear strength (N/mm) | 0.992 | 1.171 | 1.027 |
| Slip Rating | 2.2 | 2.05 | 2.05 |
| Slip Rank | 11.75 | 5.5 | 11 |
| Ra (μm) | 0.066 | 0.032 | 0.024 |
| Ry (μm) | 0.348 | 0.206 | 0.18 |
| Rz (μm) | 0.134 | 0.104 | 0.102 |
| S (μm) | 29.096 | 13.714 | 10.838 |
| Sm (μm) | 1.318 | 1.318 | 1.268 |
| RMS (μm) | 0.078 | 0.04 | 0.032 |
| Clearing counts at 150 V/μm (counts/$m^2$) | 0.2 | 0 | 0 |
| Clearing counts at 200 V/μm (counts/$m^2$) | 0 | 1 | 0.4 |
| Clearing counts at 250 V/μm (counts/$m^2$) | 5.8 | 5.5 | 1.8 |
| Clearing counts at 300 V/μm (counts/$m^2$) | 37.4 | 16.5 | 18.4 |
| Clearing counts at 350 V/μm (counts/$m^2$) | 155 | 67.0 | 55.6 |
| Clearing counts at 400 V/μm (counts/$m^2$) | 653 | — | 183 |
| Clearing counts at 450 V/μm (counts/$m^2$) | 794 | — | 511 |
| Clearing counts at 500 V/μm (counts/$m^2$) | 696 | — | 801 |

| Copolymer | C. Ex. 10 BPI/BPA/Silox 9 | C. Ex. 11 BPI/BPA/Silox 10 | Ex. 7 BPI/BPA 8 |
|---|---|---|---|
| Polysiloxane carbonate (mol %) | 0.173 | 0.445 | 0 |
| BPI carbonate (mol %) | 75.015 | 74.811 | 58 |
| BPA carbonate (mol %) | 24.812 | 24.744 | 42 |
| $M_w$ (kg/mol) | 25 | 28 | 28 |
| Film thickness (μm) | 5 | 5 | 7 |
| Processability | 0 | 0 | 3 |
| Machine direction tensile elongation (%) | 3.72 | 3.28 | 5.28 |
| Machine direction tensile stress (MPa) | 67.2 | 57.8 | 71.9 |
| Machine direction tensile modulus (MPa) | 2357 | 2087 | 2643 |
| Transverse direction tensile elongation (%) | 1.23 | 1.64 | 4.16 |
| Transverse direction tensile stress (MPa) | 30.6 | 31.8 | 62.6 |
| Transverse direction tensile modulus (MPa) | 2354 | 2035 | 2263 |
| Machine direction tear strength (N/mm) | 0.813 | 0.846 | 2.854 |
| Transverse direction tear strength (N/mm) | 2.120 | 0.938 | 0.943 |
| Slip Rating | 2.2 | 2.25 | 1 |
| Slip Rank | 12.25 | 14.75 | 1.5 |
| Ra (μm) | 0.044 | 0.028 | 0.016 |
| Ry (μm) | 0.25 | 0.176 | 0.086 |
| Rz (μm) | 0.088 | 0.092 | 0.028 |
| S (μm) | 17.712 | 11.802 | 9.358 |
| Sm (μm) | 1.272 | 1.27 | 0.972 |
| RMS (μm) | 0.052 | 0.032 | 0.018 |
| Clearing counts at 150 V/μm (counts/$m^2$) | 3.2 | 20.3 | 0 |
| Clearing counts at 200 V/μm (counts/$m^2$) | 3.4 | 3.0 | 0 |
| Clearing counts at 250 V/μm (counts/$m^2$) | 41.0 | 24.7 | 0 |
| Clearing counts at 300 V/μm (counts/$m^2$) | 75.8 | 72.3 | 0.2 |
| Clearing counts at 350 V/μm (counts/$m^2$) | 257 | 260 | 0.4 |
| Clearing counts at 400 V/μm (counts/$m^2$) | 688 | 524 | 57.6 |
| Clearing counts at 450 V/μm (counts/$m^2$) | 856 | 786 | 244 |
| Clearing counts at 500 V/μm (counts/$m^2$) | 765 | 720 | 280 |

In this experiment, tensile properties were measured for films as-extruded and after aging for 170 hours at 150° C. Results are presented in Table 3, where percent change values were calculated as 100 times (the post-aging value—the as-extruded value) divided by the as-extruded value. The results were used in a multi-response optimization model, which predicted that one of the copolymer compositions providing good processability and minimum change in physical properties on aging would comprise 61.3 mole percent bisphenol A carbonate units, 38.6 mole percent BPI carbonate units, and 0.078 mole percent polysiloxane carbonate units, all based on the total moles of carbonate units in the copolymer.

TABLE 3

| Copolymer | C. Ex. 12 BPI/BPA 1 | C. Ex. 13 BPI/BPA 4 | C. Ex. 14 BPI/BPA 5 |
|---|---|---|---|
| Polysiloxane carbonate (mol %) | 0 | 0 | 0 |
| BPI carbonate (mol %) | 80 | 45 | 45 |

TABLE 3-continued

| | | | |
|---|---|---|---|
| BPA carbonate (mol %) | 20 | 55 | 55 |
| $M_w$ (kg/mol) | 24 | 25 | 28 |
| Film thickness (μm) | 5 | 5 | 5 |
| As-Extruded Machine direction tensile elongation (%) | 5.353 | 1.667 | 7.393 |
| Post-Aging Machine direction tensile elongation (%) | 3.054 | 2.069 | 3.783 |
| Percent Change Machine direction tensile elongation (%) | −43.0 | 24.1 | −48.8 |
| As-Extruded Machine direction tensile stress (MPa) | 66.52 | 29.64 | 67.83 |
| Post-Aging Machine direction tensile stress (MPa) | 84.74 | 50.63 | 73.93 |
| Percent Change Machine direction tensile stress (%) | 27.4 | 70.8 | 9.0 |
| As-Extruded Machine direction tensile modulus (MPa) | 2152 | 1859 | 2313 |
| Post-Aging Machine direction tensile modulus (MPa) | 2998 | 2409 | 2318 |
| Percent Change Machine direction tensile modulus (%) | 39.3 | 29.6 | 0.2 |
| As-Extruded Transverse direction tensile elongation (%) | 2.429 | 2.378 | 2.805 |
| Post-Aging Transverse direction tensile elongation (%) | 1.991 | 1.799 | 2.192 |
| Percent Change Transverse direction tensile elongation (%) | −18.0 | −24.3 | −21.8 |
| As-Extruded Transverse direction tensile stress (MPa) | 45.29 | 39.19 | 44.05 |
| Post-Aging Transverse direction tensile stress (MPa) | 50.54 | 45.77 | 46.32 |
| Percent Change Transverse direction tensile stress (%) | 11.6 | 16.8 | 5.2 |
| As-Extruded Transverse direction tensile modulus (MPa) | 2209 | 1860 | 2040 |
| Post-Aging Transverse direction tensile modulus (MPa) | 2627 | 2510 | 2318 |
| Percent Change Transverse direction tensile modulus (%) | 19.0 | 34.9 | 13.7 |

| Copolymer | C. Ex. 15 BPI/BPA 6 | C. Ex. 16 BPI/BPA 7 | Ex. 8 BPI/BPA/Silox 6 |
|---|---|---|---|
| Polysiloxane carbonate (mol %) | 0 | 0 | 0.156 |
| BPI carbonate (mol %) | 57 | 62.5 | 38.151 |
| BPA carbonate (mol %) | 43 | 37.5 | 61.692 |
| $M_w$ (kg/mol) | 28 | 25 | 28 |
| Film thickness (μm) | 5 | 5 | 5 |
| As-Extruded Machine direction tensile elongation (%) | 5.743 | 3.564 | 5.504 |
| Post-Aging Machine direction tensile elongation (%) | 2.763 | 1.283 | 4.194 |
| Percent Change Machine direction tensile elongation (%) | −51.9 | -64.0 | −23.8 |
| As-Extruded Machine direction tensile stress (MPa) | 64.58 | 65.42 | 68.67 |
| Post-Aging Machine direction tensile stress (MPa) | 59.80 | 36.57 | 76.56 |
| Percent Change Machine direction tensile stress (%) | −7.4 | −44.1 | 11.5 |
| As-Extruded Machine direction tensile modulus (MPa) | 2006 | 2391 | 2213 |
| Post-Aging Machine direction tensile modulus (MPa) | 2220 | 2756 | 2326 |
| Percent Change Machine direction tensile modulus (%) | 10.7 | 15.3 | 5.1 |
| As-Extruded Transverse direction tensile elongation (%) | 3.581 | 3.319 | 1.467 |
| Post-Aging Transverse direction tensile elongation (%) | 2.063 | 2.044 | 2.195 |
| Percent Change Transverse direction tensile elongation (%) | −42.4 | −38.4 | 49.6 |
| As-Extruded Transverse direction tensile stress (MPa) | 52.16 | 58.97 | 30.64 |
| Post-Aging Transverse direction tensile stress (MPa) | 51.36 | 48.34 | 47.76 |
| Percent Change Transverse direction tensile stress (%) | −1.5 | −18.0 | 55.9 |
| As-Extruded Transverse direction tensile modulus (MPa) | 2008 | 2307 | 2082 |

TABLE 3-continued

| | | | |
|---|---|---|---|
| Post-Aging Transverse direction tensile modulus (MPa) | 2608 | 2533 | 2282 |
| Percent Change Transverse direction tensile modulus (%) | 29.8 | 9.8 | 9.6 |

| Copolymer | Ex. 9 BPI/BPA/Silox 7 | Ex. 10 BPI/BPA/Silox 8 |
|---|---|---|
| Polysiloxane carbonate (mol %) | 0.164 | 0.164 |
| BPI carbonate (mol %) | 55.655 | 55.655 |
| BPA carbonate (mol %) | 44.180 | 44.180 |
| $M_w$ (kg/mol) | 25 | 28 |
| Film thickness (μm) | 5 | 5 |
| As-Extruded Machine direction tensile elongation (%) | 4.810 | 6.556 |
| Post-Aging Machine direction tensile elongation (%) | 2.343 | 2.234 |
| Percent Change Machine direction tensile elongation (%) | −51.3 | −65.9 |
| As-Extruded Machine direction tensile stress (MPa) | 58.58 | 68.29 |
| Post-Aging Machine direction tensile stress (MPa) | 52.19 | 58.78 |
| Percent Change Machine direction tensile stress (%) | −10.9 | −13.9 |
| As-Extruded Machine direction tensile modulus (MPa) | 1934 | 2195 |
| Post-Aging Machine direction tensile modulus (MPa) | 2330 | 2683 |
| Percent Change Machine direction tensile modulus (%) | 20.5 | 22.2 |
| As-Extruded Transverse direction tensile elongation (%) | 2.120 | 2.733 |
| Post-Aging Transverse direction tensile elongation (%) | 1.044 | 1.078 |
| Percent Change Transverse direction tensile elongation (%) | −50.8 | −60.6 |
| As-Extruded Transverse direction tensile stress (MPa) | 39.68 | 48.81 |
| Post-Aging Transverse direction tensile stress (MPa) | 23.08 | 26.12 |
| Percent Change Transverse direction tensile stress (%) | −41.8 | −46.5 |
| As-Extruded Transverse direction tensile modulus (MPa) | 1931 | 2074 |
| Post-Aging Transverse direction tensile modulus (MPa) | 2253 | 2468 |
| Percent Change Transverse direction tensile modulus (%) | 16.6 | 19.0 |

The invention claimed is:

1. A composition comprising, based on the total weight of the composition:

65 to 99.95 weight percent of a copolycarbonate comprising first carbonate units derived from a first bisphenol monomer such that a homopolycarbonate of the first bisphenol monomer has a glass transition temperature less than 155° C. determined by dynamic mechanical analysis according to ASTM E1640-13 at a heating rate of 1° C./minute, and second carbonate units derived from a second bisphenol monomer such that a homopolycarbonate of the second bisphenol monomer has a glass transition temperature of 155° C. or higher determined by dynamic mechanical analysis according to ASTM E1640-13 at a heating rate of 1° C./minute; and 0.05 to 2 weight percent of a roughening agent comprising a particulate crosslinked polymethylsilsesquioxane having a median equivalent spherical diameter greater than 5 micrometers and less than or equal to 10 micrometers determined by laser diffraction according to ISO 13320:2009.

* * * * *